US010508591B2

(12) United States Patent
Upadhyay et al.

(10) Patent No.: US 10,508,591 B2
(45) Date of Patent: *Dec. 17, 2019

(54) METHOD AND SYSTEM FOR ACTIVE CASING TREATMENT CONTROL

(71) Applicant: Ford Global Technologies, LLC, Dearborn, MI (US)

(72) Inventors: Devesh Upadhyay, Canton, MI (US); Michiel J. Van Nieuwstadt, Ann Arbor, MI (US); David R. Hanna, Troy, MI (US); Leon Hu, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/653,421

(22) Filed: Jul. 18, 2017

(65) Prior Publication Data
US 2019/0024574 A1 Jan. 24, 2019

(51) Int. Cl.
*F02B 37/16* (2006.01)
*F02B 37/18* (2006.01)
(Continued)

(52) U.S. Cl.
CPC ............ *F02B 37/18* (2013.01); *F02B 37/004* (2013.01); *F02B 37/162* (2019.05); *F02B 37/24* (2013.01); *F02D 23/02* (2013.01); *F02D 41/0007* (2013.01); *F02D 41/0052* (2013.01); *F02M 26/06* (2016.02); *F04D 29/4213* (2013.01); *F04D 29/685* (2013.01); *F02B 2037/125* (2013.01); *F02D 2041/1412* (2013.01)

(58) Field of Classification Search
CPC ...... F02B 37/18; F02B 37/183; F02B 37/186; F02B 37/16; F02B 37/004; F02B 2037/162; F02B 2037/125; F02M 26/04; F02M 26/05; F02M 26/06; F02M 26/16
USPC ............. 60/611, 605.1–605.2; 701/104, 108; 415/58.4
See application file for complete search history.

(56) References Cited

U.S. PATENT DOCUMENTS 5,123,246 A 6/1992 Younessi et al.
6,067,800 A 5/2000 Kolmanovsky et al.
(Continued)

OTHER PUBLICATIONS

Zhou, J. et al., "Dynamic Steady-State Allocation for Over-Actuated Turbocharged Diesel Engines," 52nd IEEE Conference on Decision and Control, Dec. 10, 2013, Florence, Italy, 6 pages.
(Continued)

Primary Examiner — Thai Ba Trieu
(74) Attorney, Agent, or Firm — Geoffrey Brumbaugh; McCoy Russell LLP

(57) ABSTRACT

Methods and systems are provided for adjusting an active casing treatment of a compressor responsive to a predicted engine condition. In one arrangement, a controller may actuate a sleeve of a variable geometry compressor casing to a position selected based on each of a compressor pressure ratio and a mass flow through the compressor, as well as driver behavior and predicted road conditions; and adjust each of an EGR actuator and a boost actuator based on the selected position to maintain the compressor pressure ratio during the actuating.

20 Claims, 10 Drawing Sheets

(51) Int. Cl.
   *F02B 37/00* (2006.01)
   *F02D 23/02* (2006.01)
   *F04D 29/42* (2006.01)
   *F02B 37/24* (2006.01)
   *F04D 29/68* (2006.01)
   *F02M 26/06* (2016.01)
   *F02D 41/00* (2006.01)
   *F02B 37/12* (2006.01)
   *F02D 41/14* (2006.01)

(56) References Cited

U.S. PATENT DOCUMENTS

| | | | |
|---|---|---|---|
| 6,272,859 B1 | 8/2001 | Barnes et al. | |
| 6,648,594 B1* | 11/2003 | Horner | F04D 25/04 |
| | | | 415/58.4 |
| 7,076,953 B2 | 7/2006 | Kreso | |
| 7,870,731 B2* | 1/2011 | Fledersbacher | F04D 29/4213 |
| | | | 60/605.1 |
| 8,517,664 B2 | 8/2013 | Sun et al. | |
| 9,346,469 B2* | 5/2016 | Glugla | F02D 41/2432 |
| 9,527,494 B2* | 12/2016 | Glugla | B60W 10/00 |
| 9,732,646 B2* | 8/2017 | Upadhyay | F01N 3/0232 |
| 9,863,336 B2* | 1/2018 | MacNeille | F02D 41/1401 |
| 2007/0214787 A1 | 9/2007 | Noelle et al. | |
| 2014/0377051 A1 | 12/2014 | Sun et al. | |
| 2015/0224997 A1* | 8/2015 | Glugla | F02D 41/2432 |
| | | | 701/54 |
| 2015/0337745 A1* | 11/2015 | MacNeille | F02D 41/1401 |
| | | | 123/406.48 |
| 2016/0160756 A1* | 6/2016 | McGahey | F04D 27/0238 |
| | | | 415/145 |
| 2016/0201533 A1* | 7/2016 | Upadhyay | F01N 3/0232 |
| | | | 701/102 |
| 2016/0214596 A1* | 7/2016 | Glugla | B60W 10/00 |
| 2018/0340544 A1* | 11/2018 | Hanna | F04D 27/0246 |
| 2018/0340784 A1* | 11/2018 | Upadhyay | G01C 21/3469 |
| 2018/0340785 A1* | 11/2018 | Upadhyay | G01C 21/3469 |

OTHER PUBLICATIONS

Van Nieuwstadt, M. et al., "Methods and System Diagnosing a Variable Geometry Compressor for an Internal Combustion Engine," U.S. Appl. No. 15/608,909, filed May 30, 2017, 36 pages.

Van Nieuwstadt, M. et al., "Transient Compensation for Variable Geometry Compressor," U.S. Appl. No. 15/653,448, filed Jul. 18, 2017, 59 pages.

* cited by examiner

METHOD AND SYSTEM FOR ACTIVE CASING TREATMENT CONTROL

FIELD

The present description relates generally to methods and systems for controlling the operation of variable geometry compressors having an active casing treatment.

BACKGROUND/SUMMARY

Engines may use a turbocharger to improve engine torque/power output density. The turbocharger may include a compressor and a turbine connected by a drive shaft, where the turbine is coupled to the exhaust manifold of the engine and the compressor is coupled to the intake manifold of the engine. The exhaust-driven turbine supplies energy to the compressor to increase the flow of compressed air into the engine. The use of a compressor allows a smaller displacement engine to provide as much power as a larger displacement engine, but with additional fuel economy benefits.

However, compressors are prone to surge and choke. For example, when an operator tips-out of an accelerator pedal, air flow decreases, leading to reduced forward flow through the compressor at high pressure ratio (PR), possibly leading to compressor surge. In another example, surge may be caused in part by high levels of cooled exhaust gas recirculation (EGR) which increase compressor pressure while decreasing mass flow through the compressor. Compressor surge can lead to NVH issues such as undesirable noise from the engine intake system.

Compressor choke may be encountered at high flows, when an increase in compressor speed gives a diminishing increase in the rate of flow. When the flow at any point in the compressor reaches the choke condition, no further flow rate increase is possible. This condition represents the maximum compressor volumetric flow rate as a function of the pressure ratio. Choke occurs when the air flow mass through the compressor cannot be increased for a given speed of the compressor. The flow rate into the compressor may be limited by the size of the compressor inlet, and when the flow at the inlet reaches sonic velocity, the flow may not be increased further. As one example, choke may occur when an operator tips-in from a part load or idle conditions to a high load condition, such as when going uphill with a load.

Various approaches have been developed to operate a compressor outside of both the surge and choke boundaries by reducing the air flow rate before surge occurs and increasing the air flow rate before choke occurs. One example approach includes the use of a passive casing treatment for a compressor. In one example, the passive casing treatment may include an immovable slot and/or ports that modify the air flow through the compressor. During low air mass flow conditions, the slot of the passive casing treatment may provide a path to recirculate partially pressurized air back to the compressor inlet. The recirculated air flowing through the compressor may enable the compressor to operate with lower air mass flow rate before surge occurs. During high air mass flow conditions, the slots and/or ports of the passive casing treatment may provide a path to short-circuit air flow through the compressor so that the compressor may operate with a higher air mass flow rate before choke occurs. It has been recognized that one drawback of passive casing treatment systems is that an effective location for a passive recirculation slot to prevent surge is different from an effective location for a passive recirculation slot to prevent choke.

Another example approach includes the use of an active casing treatment (ACT) for a compressor, such as shown by Sun et al. in U.S. Pat. No. 8,517,664. Therein, a turbocharger includes an active casing treatment, an impeller, a casing, and a diffuser. A controller adjusts a casing sleeve responsive to mass flow conditions relative to a threshold, or based on a pressure differential in the engine system, so that slots in the casing sleeve align with either a surge slot or a choke slot. Air is selectively flowed between the impeller and the compressor inlet responsive to the slot alignment.

However, the inventors herein have recognized potential issues with such an approach. As one example, adjusting an active casing treatment (ACT) responsive to current engine operating conditions is a reactionary control method that may sacrifice efficiency and performance by not adjusting compressor operation until a compressor is already at or near a surge or choke condition. In another example, this type of reactionary control method may result in a high frequency actuation of the casing sleeve to expose (e.g., open) the choke or surge slot, which may lead to flow pulsations, further reducing compressor efficiency and degrading performance.

In one example, the issues described above may be addressed by a method for a boosted engine, comprising: actuating a sleeve of a variable geometry compressor casing to a position selected based on each of a compressor pressure ratio and a mass flow through the compressor; and adjusting each of an EGR actuator and a boost actuator based on the selected position to maintain the compressor pressure ratio during the actuating. In this way, the disturbances associated with actuation of an active casing treatment may be compensated for such that a constant pressure flow during ACT actuation may be maintained, allowing compressor operation over a wider range of operating conditions.

As one example, a boosted engine may be configured with a turbocharger having a variable geometry compressor (VGC) and an exhaust turbine. The VGC includes an impeller surrounded by a casing and an active casing treatment. The casing includes a compressor inlet, an intake passage, a recirculation passage, a surge port, a choke port, and an actuatable sleeve having a bleed port. Responsive to compressor operation within a choke margin (that is, a threshold distance from a compressor choke limit), an engine controller may actuate the casing sleeve to a choke slot causing air to flow from the compressor inlet to the impeller via the choke port of the casing. Responsive to the actuation of the sleeve to the choke slot, high pressure EGR flow may be increased by increasing the opening of a high pressure EGR valve so as to maintain air flow and pressure ratio across the compressor despite the opening of the choke port. In addition, a boost actuator such as a waste-gate valve position or a blade angle of a variable geometry turbine may be adjusted to compensate for any disturbances arising from the actuation of the sleeve to the choke slot. In comparison, responsive to compressor operation within a surge margin (that is, a threshold distance from a compressor surge limit), the engine controller may actuate the casing sleeve to a surge slot causing air to flow from the impeller to the compressor inlet via the surge port of the casing. Responsive to the actuation of the sleeve to the surge slot, high pressure EGR flow may be decreased by decreasing the opening of the high pressure EGR valve so as to maintain air flow and pressure ratio across the compressor despite the opening of the surge port. In addition, the waste-gate valve position or variable geometry turbine (VGT) blade angle may be adjusted to compensate for any disturbances arising from the actuation of the sleeve to the surge slot.

Further, the controller may dynamically (e.g., in real-time) adjust each of the choke margin to the choke limit and the surge margin to the surge limit based on driver behavior, such as based on a frequency and degree of driver pedal application, as well as drive conditions, such as road grade and altitude. If the energy demand of driver pedal application is higher, such as may occur when the driver tends to drive aggressively, at least the surge margin may be increased so that the casing sleeve is engaged to the surge slot earlier and released from the surge slot later in a drive cycle.

In this way, driver behavior may be filtered to allow for a smooth engage/disengage profile of the ACT. In addition, ACT actuation frequency is reduced. By limiting ACT actuation to a threshold actuation frequency, flow pulsations and efficiency loss from the ACT actuation may be reduced. By adjusting EGR flow and boost actuator operation based on the ACT actuation, any flow pulsations or disturbances arising from the actuation can be better mitigated, improving overall compressor performance. By adjusting the choke and surge margins based on driver behavior as well as predicted travel conditions, greater surge and choke protection can be provided. Overall, compressor operation may be better optimized for both choke and surge conditions, and the operating range of the turbocharger may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
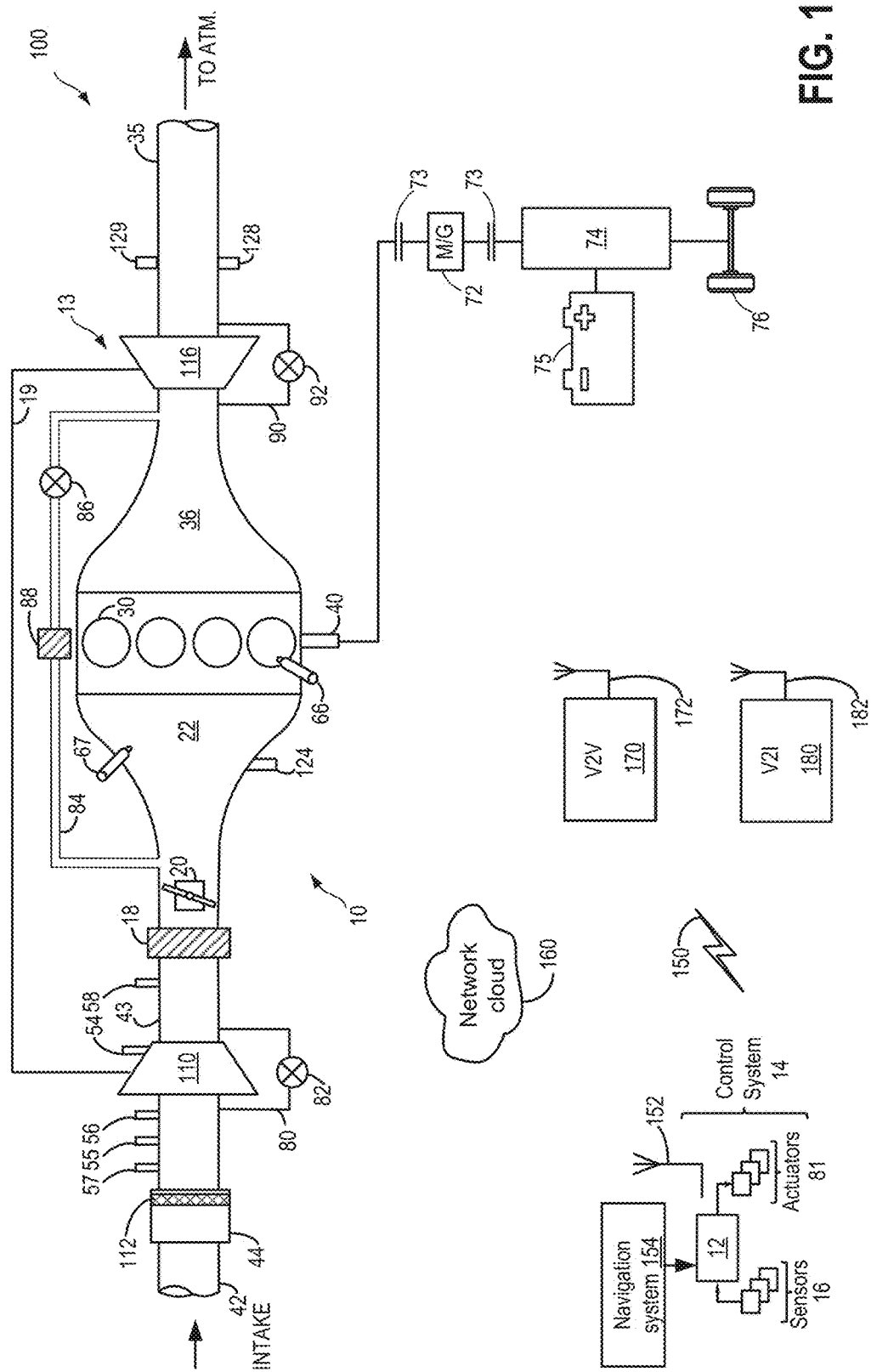
FIG. 1 shows an example embodiment of a vehicle system that includes a turbocharged engine.
Figure 2:
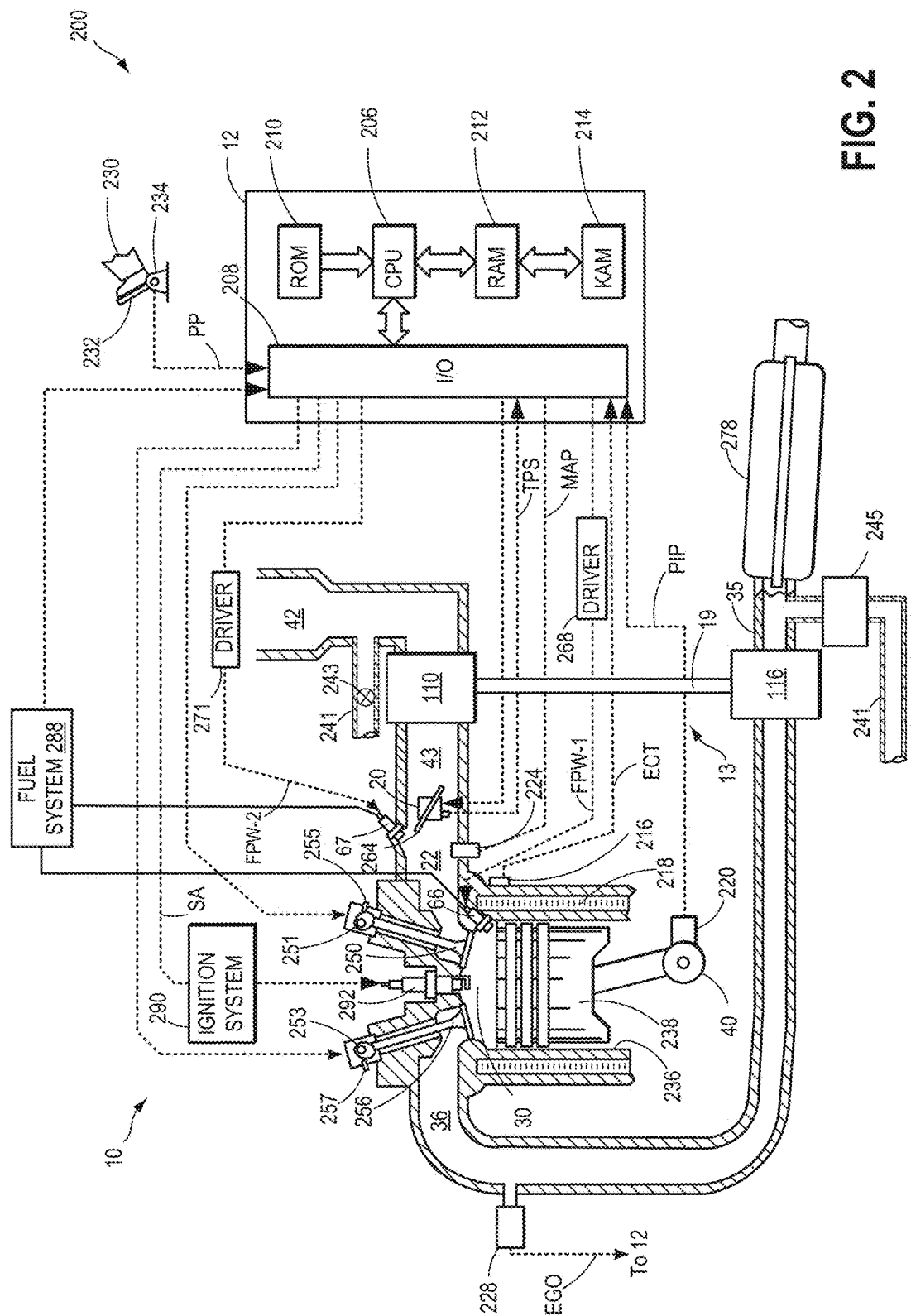
FIG. 2 shows a diagram of an example embodiment of one cylinder of the turbocharged engine of FIG. 1.

The following description relates to systems and methods for controlling operation of a turbocharger compressor's active casing treatment so as to reduce surge and choke occurrence. One non-limiting example embodiment of a hybrid vehicle system including a turbocharged engine is shown in FIG. 1. A cross-sectional view of one cylinder (e.g., "combustion chamber") of the engine of FIG. 1 is shown in FIG. 2. The example turbocharger is shown in more detail in the cross-sectional view of FIG. 3, such that the components affecting aerodynamic flow through the turbocharger, including an active casing treatment, may be examined. FIGS. 4A-4B show example positions that a sleeve of the active casing treatment can be actuated to responsive to different engine operating conditions. An engine controller may be configured to perform a control routine, such as the example routines of FIGS. 6-7, to vary the position of a sleeve of the active casing treatment based on engine operation relative to a compressor choke limit and surge limit, as inferred with reference to a compressor map, such as the map of FIG. 8. The ACT actuation may be further based on predicted operating conditions, as modeled based on driver behavior, as well as based on input received from a plurality of on-board sources such as an on-board vehicle navigation system (e.g., GPS), vehicle-to-vehicle (V2V) technology, and vehicle-to-infrastructure (V2I) technologies. For example, it may be learned that a particular driver introduces surge type conditions through frequent start-stop and aggressive load drops, aggressive tip-ins to heavy load transitions, aggressive driving in altitude, and/or heavy towing. The controller may also adjust EGR flow and exhaust flow through an exhaust turbine responsive to the ACT actuation to maintain a pressure ratio across the compressor during the ACT adjustment, as shown with reference to the example of FIG. 9. In this way, compressor operation may be maintained outside our choke and surge regions for longer durations.

Turning now to FIG. 1, an example embodiment of a vehicle system 100 is illustrated schematically (not to scale). In one example, vehicle system 100 may be configured as an on-road motor vehicle. However, it will be appreciated that in other examples vehicle system 100 may be configured as an off-road vehicle. In some examples, vehicle system 100 may be a hybrid vehicle with multiple sources of torque available to one or more vehicle wheels 76. In other examples, vehicle system 100 is a conventional vehicle with only an engine, or an electric vehicle with only electric machine(s). In the example shown, vehicle system 100 includes engine 10 and an electric machine 72. Electric machine 72 may be a motor or a motor/generator. Crankshaft 40 of engine 10 and electric machine 72 are connected via a transmission 74 to vehicle wheels 76 when one or more clutches 73 are engaged. In the depicted example, a first clutch 73 is provided between crankshaft 40 and electric machine 72, and a second clutch 73 is provided between electric machine 72 and transmission 74. Controller 12, discussed herein, may send a signal to an actuator of each clutch 73 to engage or disengage the clutch, so as to connect or disconnect crankshaft 40 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle.

Electric machine 72 receives electrical power from a traction battery 75 to provide torque to vehicle wheels 76. Electric machine 72 may also be operated as a generator to provide electrical power to charge battery 75, for example during a braking operation. In other examples, where vehicle system 100 is a conventional vehicle with only an engine, traction battery 75 may be a starting-lighting-ignition (e.g., SLI) battery that supplies electrical energy to the vehicle system 100.

In the depicted embodiment, engine 10 is a boosted engine including a turbocharger 13. Turbocharger 13 comprises a turbine 116 positioned in the exhaust passage 35 coupled to a compressor 110 positioned in an intake passage 42. Turbine 116 and compressor 110 may be coupled via a shaft 19. Compressor 110 may be positioned upstream of a charge air cooler 18 (also referred to herein as CAC) and an intake throttle 20. Turbine 116 may be driven (e.g., spun) by expanding exhaust gases from engine 10, and the rotational energy of turbine 116 may be transferred via shaft 19 to rotate compressor 110.

In one example, compressor 110 is a variable geometry compressor (VGC) having vanes that are moved in accordance with a desired vane angle to guide intake air flow into the compressor in different patterns. In addition, as elaborated with reference to FIG. 3, FIGS. 4A-4B, and FIG. 5, compressor 110 may include an active casing treatment (ACT) with a sleeve that is actuatable between different positions to reduce or increase the flow into the compressor wheel (or impeller). For example, responsive to an indication of surge (actual or predicted), the sleeve may be actuated by an engine controller to a surge slot to increase flow out of the compressor wheel to the compressor inlet. In another example, responsive to an indication of choke (actual or predicted), the sleeve may be actuated by an engine controller to a choke slot to increase flow into the compressor wheel from the compressor inlet.

In some examples, turbine 116 may be a variable geometry turbine having vanes whose angles are adjustable to guide exhaust flow through the turbine blades in different patterns, thereby varying turbine speed and boost pressure provided by turbocharger 13.

Engine 10 receives air along intake passage 42 via an air box 44 including air cleaner 112. The air is compressed by the compressor 110 of turbocharger 13 and compressed air is delivered to induction passage 43. The compressed air passes through the induction passage 43, through the CAC 18 to cool, and through the throttle 20 before entering the induction manifold 22 where it enters the engine 10. In other words, compressor 110 is coupled through charge air cooler 18 to intake throttle 20 and intake throttle 20 is coupled upstream of induction manifold 22. The charge-air cooler may be an air-to-air or water-to-air heat exchanger, for example. In the embodiment shown in FIG. 1, the pressure of the air charge within the induction manifold is sensed by a manifold air pressure (MAP) sensor 124.

It will be appreciated that other combinations and configurations of boosting devices may be possible. In one embodiment, the turbocharger may be a twin scroll device. In another embodiment, turbocharger 13 may be a variable geometry turbocharger (VGT), where turbine geometry is actively varied as a function of engine operating conditions, such as by changing a vane blade or nozzle angle. In yet another embodiment, engine system 100 may comprise a supercharger wherein compressor 110 may be at least partially driven by an electric machine and/or the engine 10, and the engine system may not include turbine 116. In still further examples, multiple boosting devices may be staged in series, such as where both a supercharger and a turbocharger are coupled to the intake passage.

Compressor 110 may include a recirculation passage 80 across the compressor. The depicted example shows a compressor recirculation valve (CRV) 82 coupled across the recirculation passage 80, where actuation of the CRV 82 adjusts the flow through the recirculation passage 80. Warm, compressed air from the compressor outlet may be recirculated back to the compressor inlet via recirculation passage 80. In some embodiments, the compressor recirculation system may alternatively, or additionally, include a recirculation passage for recirculating (cooled) compressed air from the compressor outlet, downstream of the charge air cooler to the compressor inlet or a compressor bypass for dissipating compressed air to atmosphere (not shown). The CRV 82 may be a continuously variable valve wherein a position of the valve is continuously variable from a fully closed position to a fully open position. In some embodiments, compressor recirculation valve 82 may be held partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

One or more sensors may be coupled to an inlet of the compressor 110 for determining a composition and condition of air charge entering the compressor. For example, an intake air temperature (IAT) sensor 55 may be coupled to the intake passage 42, proximate the inlet of the compressor 110, for estimating a compressor inlet temperature. As another example, a pressure sensor 56 may be coupled to the inlet of the compressor for estimating a pressure of air charge entering the compressor. In a further example, a mass airflow (MAF) sensor 57 may also be coupled to the inlet of the compressor for estimating the amount of air entering the engine. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of the CAC. A throttle inlet pressure (TIP) sensor 58 or other suitable sensor, may be coupled downstream of the compressor 110 and upstream of the throttle 20, for measuring the pressure at a location downstream of the compressor 110 and upstream of the throttle 20. In this way, a compressor outlet pressure may be determined.

Induction manifold 22 is coupled to a series of combustion chambers 30 through a series of intake valves (described further with reference to FIG. 2). The combustion chambers are further coupled to exhaust manifold 36 via a series of exhaust valves (described further with reference to FIG. 2). In the depicted embodiment, a single exhaust manifold 36 is shown. However, in other embodiments, exhaust manifold 36 may include a plurality of exhaust manifold sections. Configurations having a plurality of exhaust manifold sections may enable effluent from different combustion chambers to be directed to different locations in the engine system 10.

Combustion chambers 30 may be supplied by a fuel system (described further with reference to FIG. 2) with one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 66 and port fuel injectors 67. In the combustion chambers, combustion may be initiated via spark ignition and/or compression ignition.

As shown in FIG. 1, exhaust from the one or more sections of exhaust manifold 36 is directed to turbine 116 to drive the turbine. When reduced turbine torque is desired, some exhaust may be directed instead through a waste-gate 90, bypassing the turbine 116. Waste-gate valve 92, coupled to waste-gate 90, may be actuated open to dump at least some exhaust pressure from upstream of the turbine 116 to a location downstream of the turbine via waste-gate 90. By reducing exhaust pressure upstream of the turbine 116, turbine speed may be reduced. In one embodiment, waste-gate valve 92 may be vacuum actuated, that is, it may be actuated via the application of vacuum. The combined flow from the turbine 116 and the waste-gate 90 then flows through emission control (described further with reference to FIG. 2) before all or part of the treated exhaust may be released into the atmosphere via exhaust passage 35.

During conditions when there is a transient increase in driver torque demand, such as during a tip-in, when going from engine operation without boost to engine operation with boost, the throttle 20 opening may be increased to increase air flow to the engine. The opening of the waste-gate valve 92 may be decreased to increase the flow of exhaust gas through the turbine 116, which increases the speed of the turbine. In one example, the waste-gate valve 92 may be completely closed during boosted engine operation so that the increased speed of the turbine can drive the compressor 110.

During conditions when there is a decrease in driver torque demand, such as during a tip-out, when going from engine operation with boost to engine operation without boost, or reduced boost, the throttle 20 opening may be decreased. In one example, the throttle 20 opening may be closed. In response to compressor operation moving close to a surge limit responsive to the tip-out, the CRV 82 may be opened so that the higher speed of the turbine 116 does not overwhelm the compressor 110 and cause compressor surge. The waste-gate valve 92 is also opened to increase the flow of exhaust gas bypassing the turbine 116 and reduce turbine speed. This allows excess boost pressure to be substantially immediately relieved. An example turbocharger operation is shown in reference to FIG. 9.

During conditions when engine 10 is idling and the vehicle system 100 is stopped, the intake throttle may be opened just enough to keep the engine running. In other examples, such as where the engine includes an idle control valve, the intake throttle may be fully closed while the idle control valve is opened so that sufficient air is delivered to the engine to keep the engine idling. As such, during engine idling conditions, the compressor 110 may not be spinning.

Engine 10 may further include one or more exhaust gas recirculation (EGR) passages for recirculating a portion of exhaust gas from the exhaust manifold to the intake manifold. By recirculating some exhaust gas, an engine dilution may be affected which may improve engine performance by reducing engine knock, peak cylinder combustion temperatures and pressures, throttling losses, and NOx emissions. In the depicted example, exhaust gas may be recirculated from exhaust manifold 36, upstream of turbine 116, to intake manifold 22, downstream of compressor 110 and throttle 20 via EGR passage 84. This configuration may be known as a high pressure (HP) EGR system. EGR passage 84 may include an EGR valve 86 for controlling HP EGR flow and an EGR cooler 88 for cooling exhaust gas prior to delivery in the intake manifold. In still further examples, exhaust gas may be recirculated from exhaust passage 35, downstream of turbine 116, to intake passage 22, upstream of compressor 110, via a distinct EGR passage to provide low pressure (HP) EGR. An example of LP EGR is shown with reference to FIG. 1. As elaborated at FIGS. 6-7, following actuation of an ACT sleeve, one or more of the EGR valve and an additional boost actuator (such as waste-gate valve 92) may be actuated to reduce air flow disturbances incurred by the compressor ACT sleeve actuation.

Engine system 100 may further include control system 14 which includes controller 12. Controller 12 is shown receiving information from a plurality of sensors 16 (various examples of which are described herein) and sending control signals to a plurality of actuators 81 (various examples of which are described herein). As one example, sensors 16 may include MAP sensor 124, an exhaust temperature sensor 128, an exhaust pressure sensor 129, intake air temperature sensor 55, compressor inlet pressure sensor 56, manifold air flow sensor 57, and throttle inlet pressure sensor 58. Other sensors such as additional pressure, temperature, air/fuel ratio, and composition sensors may be coupled to various locations in engine system 10. In one example, a compressor speed sensor 54 may be coupled to compressor 110 to determine a rotational speed of the compressor. According to one non-limiting embodiment, compressor speed sensor 54 may be a passive eddy current sensor. In one example, compressor speed sensor 54 may be a passive eddy current sensor. The actuators 81 may include, for example, throttle 20, compressor recirculation valve 82, waste-gate valve 92, direct fuel injector 66, and port fuel injector 67.

Control system 14 may be coupled to navigation system 154 and wireless communication device 152. Navigation system 154 determines the location of vehicle system 100 at key-on and at any other instant of time. A location (e.g., GPS co-ordinates of the vehicle) of the vehicle system 100 as estimated by the navigation system 154 may be stored at the control system 14 for use during the driving cycle. The navigation system may be connected to an external server and/or network cloud 160 via wireless communication 150. The navigation system 154 may determine the current location of the vehicle system 100 and obtain traffic and road condition data from a network cloud 160 for use when controlling engine operation. In addition, based on an operator selected destination, the navigation system 154 may provide various path selection, and then provide turn-by-turn instructions for navigating the vehicle system from a current location (e.g., place of origin) to the selected destination.

Controller 12 may also receive input data via a wireless communication device 152 using wireless communication 150 from one or more of a network cloud 160, vehicle-to-vehicle technology (V2V) 170 and vehicle-to-infrastructure technology (V2I) 180. V2V 170 may allow control system 14 to communicate with other similarly equipped vehicles that include wireless communication device 172, to gather information on traffic and road conditions from infrastructure that includes a wireless communication device 182. In one example, V2V may indicate vehicle speeds along an intended route, such as whether other vehicles may be stopped ahead, or whether there is stop-and-go traffic along the current route relative to an alternate route. In another example, V2I may indicate an impending red traffic light or a traffic accident along the predicted route. In this way, vehicle system 100 may communicate with remote sources (e.g., external network cloud, other vehicles, infrastructure)

using one or more technologies (e.g., wireless communication, navigation system, GPS, V2V, V2I).

Various kinds of data, including but not limited to gradient map data and upcoming traffic conditions may be exchanged among vehicles and the network cloud and this data may be utilized for controlling vehicle operation. In one example, based on navigation system 154 input, controller 12 may recognize a travel pattern. Specifically, controller 12 may "learn" that a vehicle operator travels the same route every weekday morning commuting to work. The controller may store data about the route, including road gradient information and/or expected traffic conditions, and along with a learned driver model, may actively control the compressor casing treatment in order to avoid a predicted choke or predicted surge condition. A learned driver model may be developed by storing data related to the habits of a vehicle operator. For example, over the course of several weekday commutes, the controller may learn that during morning commutes, the driver exhibits relatively moderate driving habits (e.g., as indicated by gradual and infrequent actuation of the accelerator pedal and brake pedal, resulting in gradual acceleration and sporadic braking). This type of driving behavior, herein referred to as a "moderate driver pattern," may result in a low energy density actuation of the accelerator pedal.

As another example, the controller may learn that during evening commutes, the driver exhibits more aggressive driving habits (e.g., as indicated by more abrupt and more frequent actuation of the accelerator pedal and brake pedal) may result, herein referred to as an "aggressive driver pattern," for illustrative purposes. An aggressive driver pattern may result in a high energy density actuation of the accelerator pedal. While these examples are meant to illustrate the value of establishing a driver model, they are in no way to be limiting and still further patterns may be modeled, learned, and characterized. It will be appreciated that any suitable number of driver patterns may be included in the learned driver model to characterize distinct driving habits. When the vehicle controller recognizes a high energy density actuation, implying potentially aggressive driving behavior, the controller may determine that the compressor may be more likely to go into surge. Accordingly, responsive to the identification of an aggressive driver pattern, the controller may increase the surge margin to a surge limit (that is, a threshold margin from a surge limit at which a surge mitigating action is initiated). Consequently, a sleeve of the compressor's active casing treatment may be actuated to a surge slot earlier, and held in the surge slot longer, than it would have been responsive to a moderate driver pattern, thereby providing greater surge protection for the compressor.

In this way, the on-board controller 12 may communicate with on-board controllers of other vehicles via their respective navigation systems 154, via wireless communication device 152, and/or via other forms of vehicle to vehicle technology (V2V).

Figure 6:
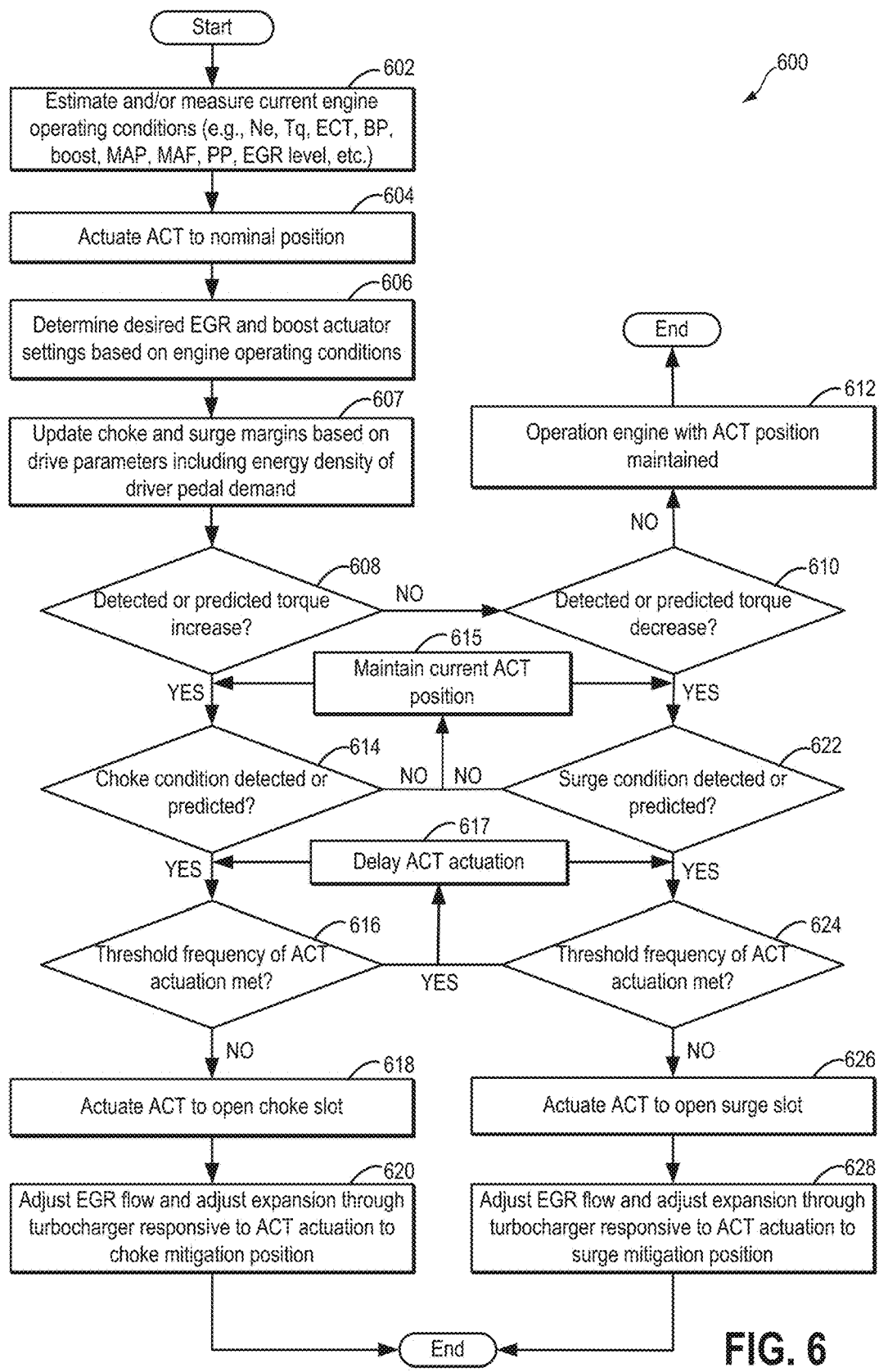
FIG. 6 shows a high level flow chart of active sleeve casing actuation responsive to predicted choke and/or surge conditions.
Figure 7:
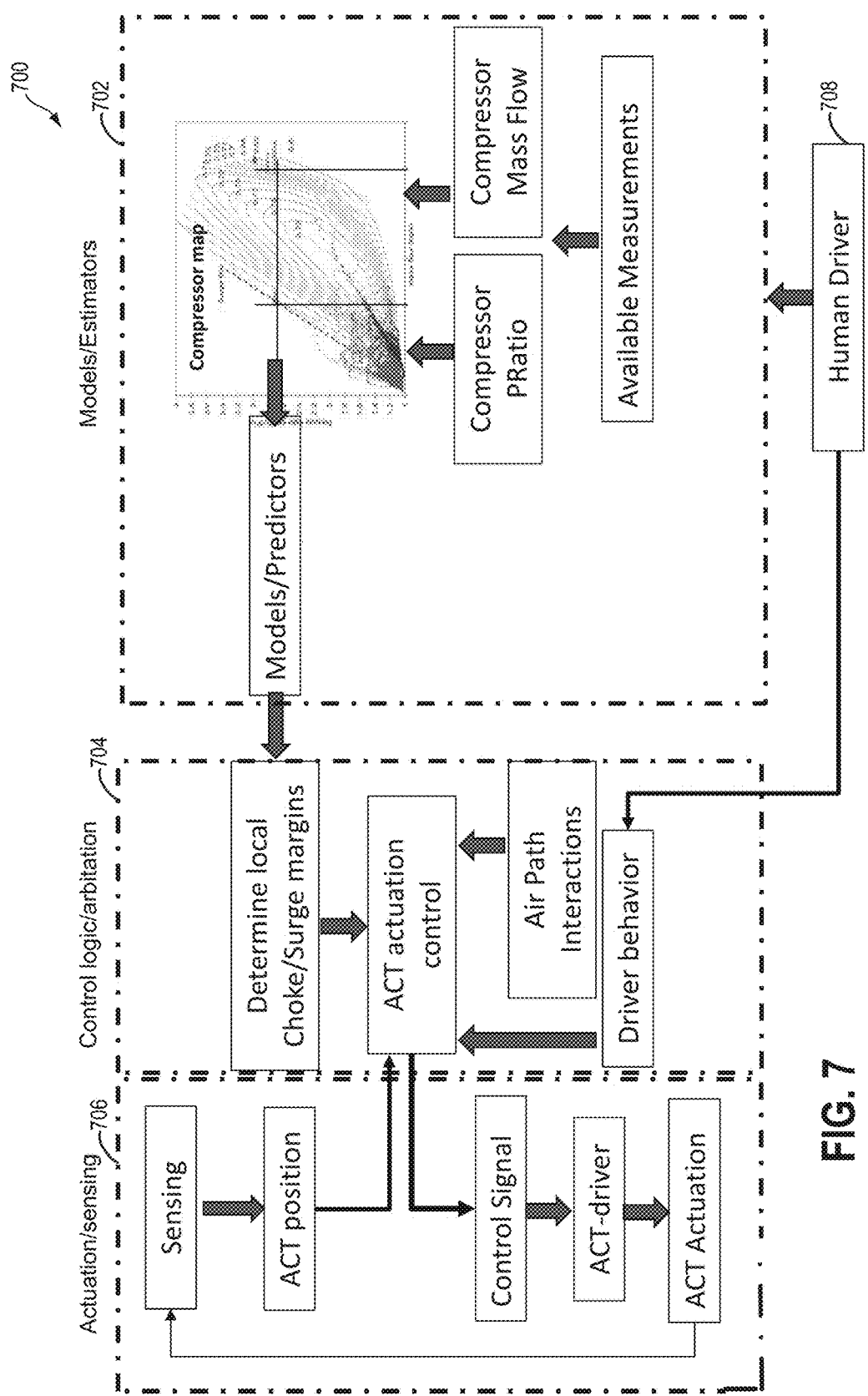
FIG. 7 shows a block diagram of active casing treatment control for a variable geometry compressor in a turbocharged engine.

The controller 12 may employ the actuators 81 in response to the processed input data received from the various sensor based on instructions stored in the memory of the controller or code programmed therein corresponding to one or more routines, such as the example control of FIGS. 6-7. As one example, controller 12 may determine whether operating conditions of compressor 110 are within a threshold of surge. In one example, to determine compressor operating conditions relative to a surge threshold, a pressure ratio across the compressor and a compressor speed may be determined. In some examples, a pressure ratio of the compressor 110 may be determined by dividing the sensed absolute pressure at the compressor outlet by the sensed absolute pressure at the compressor inlet. In the depicted example, the output of compressor inlet pressure sensor 56 may be used to determine a pressure upstream of the compressor, and output of throttle inlet pressure sensor 58 may be used to determine a pressure downstream of the compressor. In addition, the controller may determine a rotational speed of the compressor 110 using the output of compressor speed sensor 54. Responsive to pressure ratio of the compressor 110 being within a threshold margin of a defined surge limit of the compressor, controller 12 may send a signal to actuate a sleeve of an active casing treatment of compressor 110 in order to increase the opening of a surge slot to provide a path to recirculate partially pressurized air back to the compressor inlet.

Turning now to FIG. 2, an example embodiment 200 of a combustion chamber (e.g., cylinder) of an internal combustion engine (such as engine 10 of FIG. 1) is shown. Components previously introduced in FIG. 1 may be similarly numbered. Engine 10 may receive control parameters from a control system including controller 12 and input from a vehicle operator 230 via an input device 232. In this example, input device 232 includes an accelerator pedal and a pedal position sensor 234 for generating a proportional pedal position signal PP. Cylinder (herein also "combustion chamber") 30 of engine 10 may include combustion chamber walls 236 with piston 238 positioned therein. Piston 238 may be coupled to crankshaft 40 so that reciprocating motion of the piston is translated into rotational motion of the crankshaft. Crankshaft 40 may be coupled to at least one drive wheel of the vehicle system via a transmission system.

Cylinder 30 can receive intake air via intake passage 42, induction passage 43, and induction manifold 22. Induction manifold 22 may communicate with other cylinders of engine 10 in addition to cylinder 30. In some embodiments, one or more of the intake passages may include a boosting device such as a turbocharger or a supercharger. For example, FIG. 2 shows engine 10 configured with turbocharger 13 including compressor 110 arranged between intake passage 42 and induction passage 43, and an exhaust turbine 116 arranged between exhaust manifold 36 and exhaust passage 35. Compressor 110 may be at least partially powered by exhaust turbine 116 via shaft 19 where the boosting device is configured as a turbocharger. As previously described, in examples where engine 10 is provided with a supercharger, exhaust turbine 116 may be optionally omitted, where compressor 110 may be powered by mechanical input from a motor or the engine 10. Throttle 20 may include a throttle plate 264, and may be provided along an intake passage of the engine for varying the flow rate and/or pressure of intake air provided to the engine cylinders. For example, throttle 20 may be disposed downstream of compressor 110 or alternatively may be provided upstream of compressor 110.

Exhaust manifold 36 may receive exhaust gases from other cylinders of engine 10 in addition to cylinder 30. Exhaust gas sensor 228 is shown coupled to exhaust manifold 36 upstream of emission control device 278, but it will be appreciated that it may be located at other locations in the exhaust system. Exhaust gas sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Each cylinder of engine 10 may include one or more intake valves and one or more exhaust valves. For example, cylinder 30 is shown including at least one poppet-style intake valve 250 and at least one poppet-style exhaust valve 256 located at an upper region of cylinder 30. In some embodiments, each cylinder of engine 10, including cylinder 30, may include at least two intake poppet valves and at least two exhaust poppet valves located at an upper region of the cylinder.

Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT), and/or variable valve lift (VVL) systems that may be operated by controller 12 to vary valve operation. Whether electronically actuated or cam actuated, the timing of exhaust and intake valve opening and closure may be adjusted as specified for desired combustion and emissions-control performance. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. Additionally, a VCT system may include one or more VCT devices (not shown) that may be actuated to adjust the timing of the intake and exhaust valves to a timing that provides decreased positive intake to exhaust valve overlap. That is to say, the intake and exhaust valves will be open for a shorter duration and will move away from being simultaneously open for a portion of the intake stroke. In still other embodiments, the intake and exhaust valves may be controlled by a common valve actuator or actuation system, or a variable valve timing actuator or actuation system.

In some embodiments, each cylinder of engine 10 may include a spark plug 292 for initiating combustion. Ignition system 290 may provide an ignition spark to cylinder 30 via spark plug 292 in response to spark advance signal SA from controller 12, under select operating modes. In other embodiments, compression-ignition engines may use a glow plug in place of spark plug 292.

In some embodiments, each cylinder of engine 10 may be configured with one or more injectors for delivering fuel to the cylinder 30. As a non-limiting example, cylinder 30 is shown including two fuel injectors 66 and 67. Fuel injectors 66 and 67 may be configured to deliver fuel received from fuel system 288 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 66 is shown coupled directly to cylinder 30 for injecting fuel directly therein in proportion to the pulse width of signal FPW-1 received from controller 12 via electronic driver 268. In this manner, fuel injector 66 provides what is known as direct injection (hereafter referred to as "DI") of fuel into combustion cylinder 30. While FIG. 2 shows injector 66 positioned to one side of cylinder 30, it may alternatively be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing.

Fuel injector 67 is shown arranged in intake manifold 22, rather than in cylinder 30, in a configuration that provides what is known as port injection of fuel (hereafter referred to as "PFI") into the intake port upstream of cylinder 30. Fuel injector 67 may inject fuel, received from fuel system 288, in proportion to the pulse width of signal FPW-2 received from controller 12 via electronic driver 271. Note that a single electronic driver 268 or 271 may be used for both fuel injection systems, or multiple drivers, for example electronic driver 268 for fuel injector 66 and electronic driver 271 for fuel injector 67, may be used, as depicted.

Fuel may be delivered by both injectors to the cylinder during a single cycle of the cylinder. For example, each injector may deliver a portion of a total fuel injection that is combusted in cylinder 30. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 30.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 35 (e.g., downstream of turbine 116) to intake passage 42 (e.g., upstream of compressor 110) via EGR passage 241. This configuration may be known as a low pressure (LP) EGR system. Further, an EGR sensor 245 may be arranged within the EGR passage 241 and may provide an indication of one or more of pressure, temperature, and concentration of the exhaust gas. Other non-limiting example EGR configurations may include what is known as a high pressure (HP) EGR system (shown in FIG. 1) where exhaust from exhaust passage 36 (e.g., upstream of turbine 116) may be recirculated via a passage to induction passage 43 (e.g., downstream of compressor 110). The amount of EGR provided to intake passage 42 may be varied by controller 12 via EGR valve 243. In some examples, EGR system may include an EGR cooler and/or an EGR valve.

Controller 12 is shown as a microcomputer, including microprocessor unit 206, input/output ports 208, an electronic storage medium for executable programs and calibration values shown as read-only memory chip 210 in this particular example, random access memory 212, keep alive memory 214, and a data bus. Controller 12 may receive various signals from sensors coupled to engine 10, in addition to those signals previously discussed, including measurement of engine coolant temperature (ECT) from temperature sensor 216 coupled to cooling sleeve 218; a profile ignition pickup signal (PIP) from Hall effect sensor 220 (or other type) coupled to crankshaft 40; throttle position (TPS) from a throttle position sensor; and manifold absolute pressure signal (MAP) from sensor 224. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory chip 210 can be programmed with computer readable data representing instructions executable by microprocessor unit 206 for performing the methods described below as well as other variants that are anticipated but not specifically listed.

The controller 12 receives signals from the various sensors of FIGS. 1-2 and employs the various actuators of FIGS. 1-2 to adjust engine operation based on the received signals and instructions stored on a memory of the controller. For example, responsive to compressor operation within a margin to a surge limit, the controller may send a signal to an actuator coupled to a sleeve of the compressor's active casing treatment to actuate the sleeve to a surge position where a surge port of the casing is open and a choke port of the casing is closed. As another example, responsive to compressor operation within a margin to a choke limit, the controller may send a signal to the actuator coupled to the sleeve of the compressor's active casing treatment to actuate the sleeve to a choke position where the choke port of the casing is open and the surge port of the casing is closed.

Figure 3:
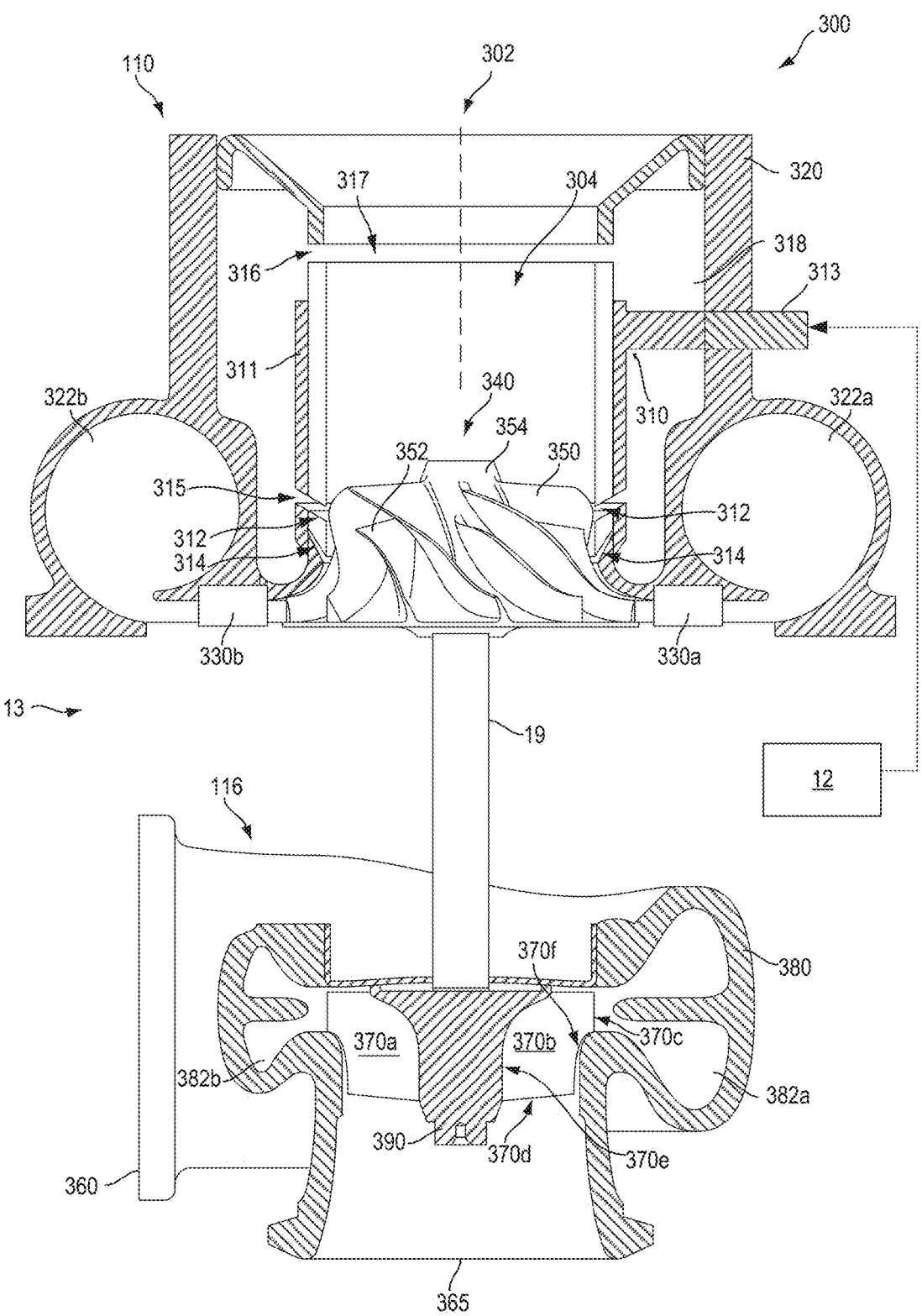
FIG. 3 shows a cut-away view of an example embodiment of the turbocharger of FIGS. 1 and 2 having a compressor and a turbine.
Figure 4A:
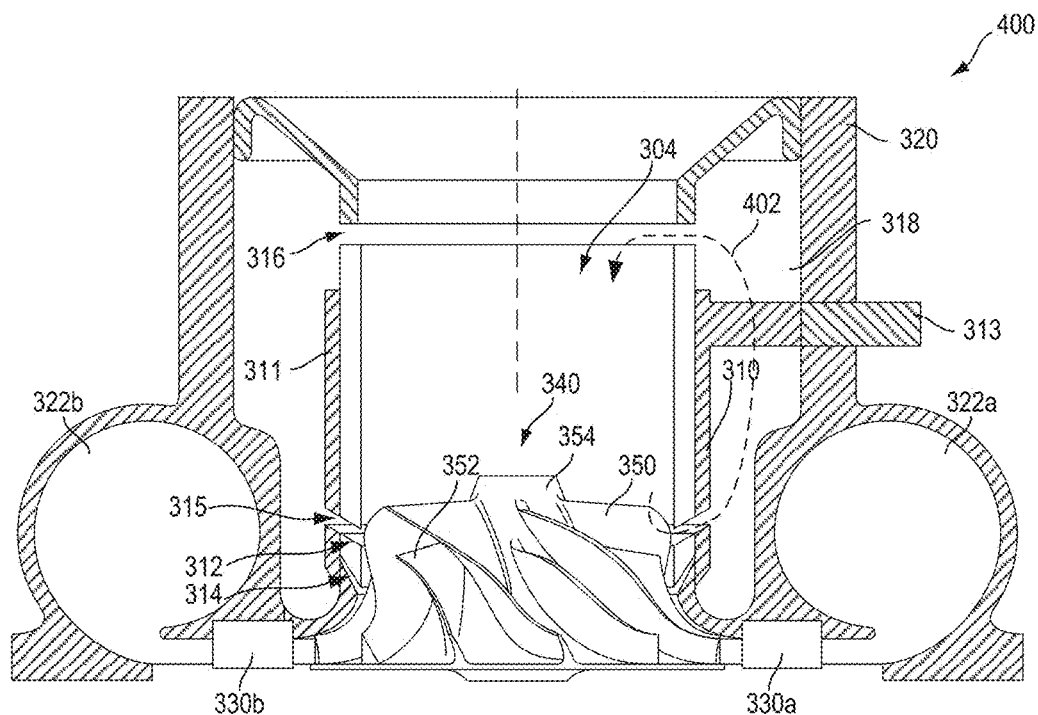
FIGS. 4A-4B show actuation of a sleeve of the active casing treatment to a surge slot and a choke slot, respectively.
Figure 4B:
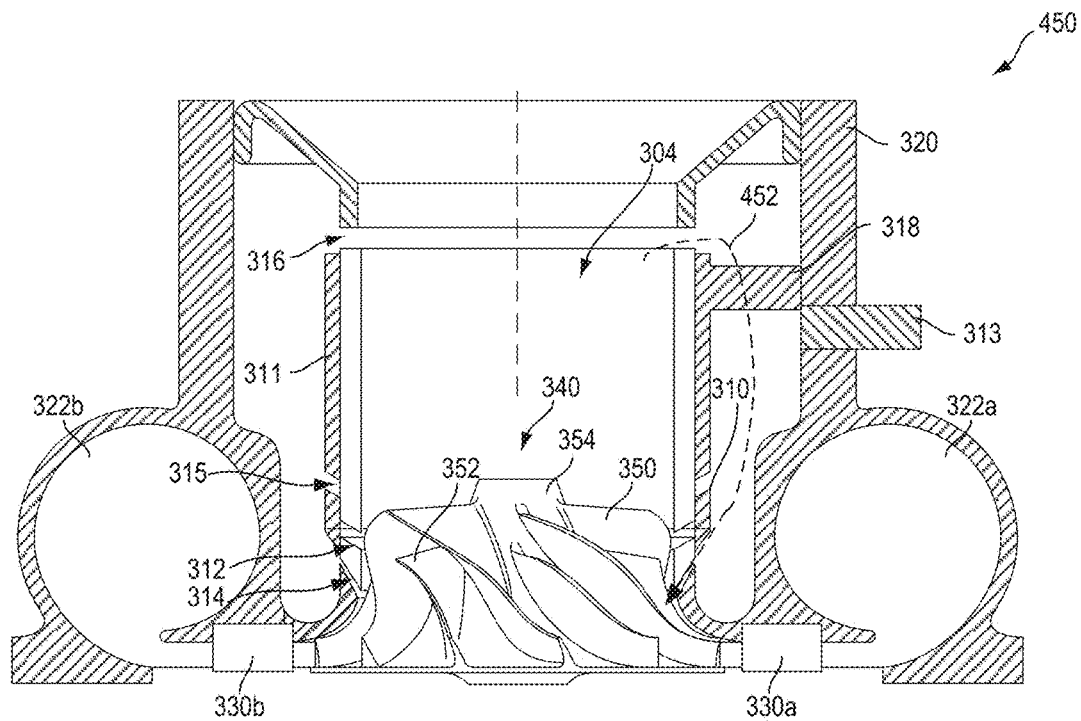

Turning now to FIG. 3, embodiment 300 shows a cross-sectional view of turbocharger 13, as shown in FIGS. 1 and 2. Components introduced in FIGS. 1 and 2 will be similarly numbered. Turbine 116 converts the energy of the exhaust gas into rotational energy for rotating drive shaft 19 connected to impeller 340. Exhaust gas from exhaust manifold 36 enters turbine housing 380 through turbine inlet 360. The exhaust gas flows through volute passage 382 (e.g., 382a, 382b) expanding through turbine outlet 365 and out exhaust passage 35. The flow of exhaust gas through turbine 116 generates a force on one or more blades 370 coupled to hub 390 causing the one or more blades 370, hub 390, and drive shaft 19 to rotate. Two blades, 370a and 370b, are shown in FIG. 3, but one skilled in the art will appreciate that more blades may be present in turbine 116. Turbine blades 370 (e.g., 370a, 370b) include inlet edge 370c, outlet edge 370d, hub edge 370e, and casing edge 370f.

Compressor 110 includes impeller 340, diffuser 330 (e.g., 330a, 330b), compressor chamber 322 (e.g., 322a, 322b), active casing treatment 310, and casing 320. Active casing treatment (ACT) 310 includes ACT sleeve 311, and ACT sleeve actuation arm 313 via which a position of ACT sleeve 311 can be adjusted. The rotation of impeller 340 draws charge air or gas into compressor 110 through compressor inlet 302 of casing 320. As non-limiting examples, the charge air or gas may include air from intake passage 42, exhaust gas (such as when EGR is active), gaseous fuel (such as when using port injection of fuel), and combinations thereof. This mixture of incoming gas may be collectively referred to as "gas flow" or "air flow." Gas flows from compressor inlet 302 and is accelerated by impeller 340 through diffuser 330 into compressor chamber 322. Diffuser 330 and compressor chamber 322 decelerate the gas causing an increase in pressure in compressor chambers 322a, 322b. Gas under pressure may flow from compressor chambers 322a, 322b to intake manifold 22.

Elements in turbocharger 13 may be described relative to the direction of the gas flow path through turbocharger 13. An element substantially in the direction of gas flow relative to a reference point is downstream from the reference point. An element substantially opposite the direction of gas flow relative to a reference point is upstream from the reference point. For example, compressor inlet 302 is upstream from impeller 340 which is upstream from diffuser 330. Diffuser 330 is downstream from impeller 340 which is downstream from compressor inlet 302.

Impeller 340 includes hub 354, full blade 350, and splitter 352. Full blade 350 and splitter 352 are attached to hub 354. The edge of full blade 350 that is most upstream in compressor 110 is the leading edge of full blade 350. Similarly, splitter 352 includes a leading edge at the most upstream portion of splitter 352. The leading edge of full blade 350 is upstream of splitter 352. Impeller 340 includes an axis of rotation aligned with the axis of rotation for drive shaft 19 and turbine hub 390. The axis of rotation is substantially parallel with the flow of gas at the compressor inlet and substantially perpendicular to the flow of gas at the diffuser.

Casing 320 includes compressor inlet 302, intake passage 304, recirculation passage 318, recirculation port 316, bleed passage 317, surge slot 312, and choke slot 314. Impeller 340 is contained in intake passage 304. Surge slot 312 is located on casing 320, downstream of the leading edge of full blade 350 and upstream of the leading edge of splitter 352. Choke slot 314 is downstream of the leading edge of splitter 352 and downstream of surge slot 312 on the casing 320. Recirculation port 316 is downstream of compressor inlet 302 and upstream of impeller 340. Recirculation port 316 is configured to enable gas to flow between intake passage 304 and recirculation passage 318.

Active casing treatment (ACT) 310 includes a plurality of ports 315 cut into sleeve 311. Active casing treatment (ACT) 310 is configured to control gas flow through compressor 110. Specifically, active casing treatment 310, controlled by controller 12 via signals sent to ACT sleeve actuation arm 313, may selectively control the flow of gas between intake passage 304 and recirculation passage 318 through one of surge slot 312 and choke slot 314. As elaborated below, during conditions when compressor surge may occur, such as at low mass flow conditions, active casing treatment 310 may enable gas to flow from intake passage 304 through surge slot 312 into recirculation passage 318. The gas further continues from recirculation passage 318 through recirculation port 316 into intake passage 304. Thus, the flow of gas striking the leading edge of full blade 350 may be greater than without allowing air to flow through surge slot 312. The additional flow of recirculating gas may enable the turbocharger compressor to operate with a lower air flow through compressor inlet 302 before surge occurs.

During conditions when compressor choke may occur, such as at high mass flow conditions, active casing treatment 310 may enable gas to flow from the impeller to the intake passage 304 via choke slot 314 and recirculation passage 318. During high mass flow conditions, a low pressure zone may be present in intake passage 304 downstream of the leading edge of splitter 352 adjacent to choke slot 314. The low pressure zone may induce gas to flow from intake passage 304 through recirculation port 316 and bleed passage 317 into recirculation passage 318 and then to the impeller through choke slot 314. The short-circuit path through recirculation passage 318 may enable the flow of gas through the compressor to be increased at high mass flow conditions when compared to a compressor without choke slot 314. In this way, the short-circuit flow of gas may enable more gas to flow before the turbocharger is in the choke operating condition.

Intake passage 304 may be substantially cylindrical. Recirculation passage 318 may be substantially annular since it is external to intake passage 304. The ports connecting intake passage 304 and recirculation passage 318, such as recirculation port 316, bleed passage 317, choke slot 314, and surge slot 312 may each be implemented with various means. For example, the ports may be constructed as one or more holes formed in the casing. As another example, the ports may be constructed as one or more slots extending around the circumference of the intake passage. The ports may have a uniform or non-uniform width along the length of the port from intake passage 304 to recirculation passage 318. Each port may have a centerline extending along the length of the port from intake passage 304 to recirculation passage 318. The centerline may be normal to the axis of rotation of impeller 340, or the centerline may have a non-zero slope when compared to the normal to the axis of rotation of impeller 340.

Active casing treatment 310 may be implemented in many ways. For example, a slideable casing sleeve 311 may be fitted in the recirculation passage to selectively block the flow of gas through choke slot 314 and/or surge slot 312. The casing sleeve may include one or more holes, ports, or slots 315 that are selectively alignable with choke slot 314 and/or surge slot 312 depending on the position of the casing sleeve. A position of the casing sleeve 311 may be adjusted by actuation of ACT sleeve arm 313 based on control signals received from controller 12. For example, responsive to low mass flow conditions or conditions when a compressor pressure ratio is within a surge margin to a surge limit, casing sleeve arm 313 may be actuated via signals commanded by controller 12 to a first position where slot 315 of the casing sleeve aligns with surge slot 312 but not choke slot 314. As a result, the casing sleeve may be adjusted so that surge slot 312 is open and choke slot 314 is blocked during low mass flow conditions. This allows gas to be recirculated from the impeller to the intake passage via the recirculation passage, moving compressor operation further away from the surge limit.

As another example, responsive to high mass flow conditions or conditions when a compressor pressure ratio is within a choke margin to a choke limit, casing sleeve arm 313 may be actuated via signals commanded by controller 12 to a second position (different from the first position) where port or slot 315 of the casing sleeve aligns with choke slot 314 but not surge slot 312. As a result, the casing sleeve may be adjusted so that choke slot 314 is open and surge slot 312 is blocked during high mass flow conditions. This allows gas to be recirculated from the intake passage to the impeller via the choke slot passage, moving compressor operation further away from the choke limit.

In other examples, responsive to a controller 12 command to adjust the position of the active casing treatment, casing sleeve 310 may slide or rotate such that it does not overlap or impede the intended port (e.g., choke slot 314 or surge slot 312) in any way, thereby selectively opening choke slot 314 or surge slot 312. These positions will be described further with reference to FIGS. 4A-4B. In an alternative embodiment, active casing treatment 310 may be adjusted based on a pressure differential across compressor inlet 304 and intake manifold 44. In yet another alternative embodiment, active casing treatment 310 may be adjusted based on a pressure differential across intake manifold 44 and turbine inlet 360. It will be understood that these specific embodiments are presented for example, and are not intended to be limiting in any manner.

Turning now to FIGS. 4A-4B, example actuation of a sleeve of a compressor active casing treatment (such as ACT sleeve 311 of FIG. 3) and the resulting flow patterns through the compressor are shown. Embodiment 400 of FIG. 4A shows a view of the cross-section of FIG. 3 with the sleeve of the active casing treatment in a first position that enables surge control. Embodiment 450 of FIG. 4B shows a view of the cross-section of FIG. 3 with the sleeve of the active casing treatment in a second position that enables choke control. It will be appreciated that all components shown in FIGS. 4A-B have been introduced earlier, and are therefore not re-introduced here.

FIG. 4A shows a first example positioning 400 of the active casing treatment 311 responsive to a low mass flow conditions that may cause the compressor to operate within a threshold of a surge limit. For example, responsive to a compressor pressure ratio being within a surge margin to a surge limit, the controller may send a control signal to ACT sleeve arm 313 to move ACT sleeve 311 to a first position where slot 315 overlaps the surge port 312. In this position, the surge port is open and the choke port is closed. As a result of actuating the sleeve to the first position, active casing treatment 310 may enable air to flow from intake passage 304 through surge slot 312 and slot 315 into recirculation passage 318 during low mass flow conditions. The air flow then continues from recirculation passage 318 through recirculation port 316 into intake passage 304, as shown by dashed arrow 402. Thus, the flow of air charge striking the leading edge of full blade 350 may be greater than when surge slot 312 is left closed/blocked by the sleeve (as shown in FIG. 4B). The recirculation of charge may enable the turbocharger compressor to operate with less flow through the compressor, reducing surge occurrence.

FIG. 4B shows a second example positioning 450 of the active casing treatment 310 responsive to a high mass flow condition that may cause the compressor to operate within a threshold of a choke limit. For example, responsive to a compressor pressure ratio being within a choke margin to a choke limit, the controller may send a control signal to ACT sleeve arm 313 to move the ACT sleeve 311 to a second position where slot 315 overlaps the choke port. In this position, the surge port is closed and the choke port is open. In particular, during high mass flow conditions, a low pressure zone may be present in intake passage 304 downstream of the leading edge of splitter 352 adjacent to choke slot 314. The low pressure zone may induce gas to flow from intake passage 304 through recirculation port 316 into recirculation passage 318 through choke slot 314 back into intake passage 304, as shown by 452. The short-circuit path through recirculation passage 318 may enable the flow of gas through the compressor to be increased at high mass flow conditions when compared to a compressor without choke slot 314. In this way, the short-circuit flow of gas may enable more gas to flow before the turbocharger is in the choke operating condition.

It will be appreciated that the ACT mechanism of FIG. 3 and FIGS. 4A-4B depict a movable sleeve in a three-position system that regulates the opening of two distinct flow channels in the compressor, viz. the choke slot and the surge slot. Herein, the three positions are the nominal position (where both the choke slot and the surge slot are closed), a first surge position (where only the choke slot is closed), and a second choke position (where only the surge slot is closed).

However, in alternate embodiments, the ACT mechanism may be coupled in a two-position system having only one controlled slot, viz. the choke slot. Therein, the two positions are the nominal position (where the choke slot is closed), and a first choke position (where the choke slot is open), and wherein the surge slot is uncontrolled and operates via passive operation and default nominal provides increased surge margin.

FIG. 3 and FIGS. 4A-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the components of FIGS. 1-4B provides a boosted engine system comprising an engine; an intake compressor having an impeller, a choke slot, a surge slot, an actuatable annular casing housing the impeller, the casing comprising a sleeve slot, and an actuator coupled to a sleeve of the casing; an exhaust turbine; an EGR valve coupled in an EGR passage for recirculating exhaust gas from downstream of the turbine to upstream of the compressor; a pedal for receiving operator torque demand; and a controller. The controller may be configured with computer readable instructions stored on non-transitory memory for: responsive to a current change in pedal position, comparing compressor efficiency with the actuator at a current position relative to each of a first and second position, estimating compressor efficiency with the actuator at a first and a second position, the compressor efficiency estimated based on compressor pressure ratio, mass flow, the current change in pedal position, and a history of past changes in pedal position over a given drive cycle; actuating, via the actuator, the sleeve to one of the first and second position having greater compressor efficiency; estimating a boost pressure disturbance associated with the actuating; and adjusting the opening of the EGR valve based on the estimated boost pressure disturbance. The controller may include further instructions for adjusting an exhaust flow bypassing the waste-gated turbine based on the estimated boost pressure disturbance when the turbine is a waste-gated turbine; and adjusting a blade angle of the turbine based on the estimated boost pressure disturbance when the turbine is a variable geometry turbine. In one example, in the first position, the sleeve slot is aligned with the choke slot, and compressed air is drawn into the impeller from a compressor inlet via the choke slot, and in the second position, the sleeve slot is aligned with the surge slot, and compressed air is recirculated from the impeller to the compressor inlet via the surge slot.

Figure 5:
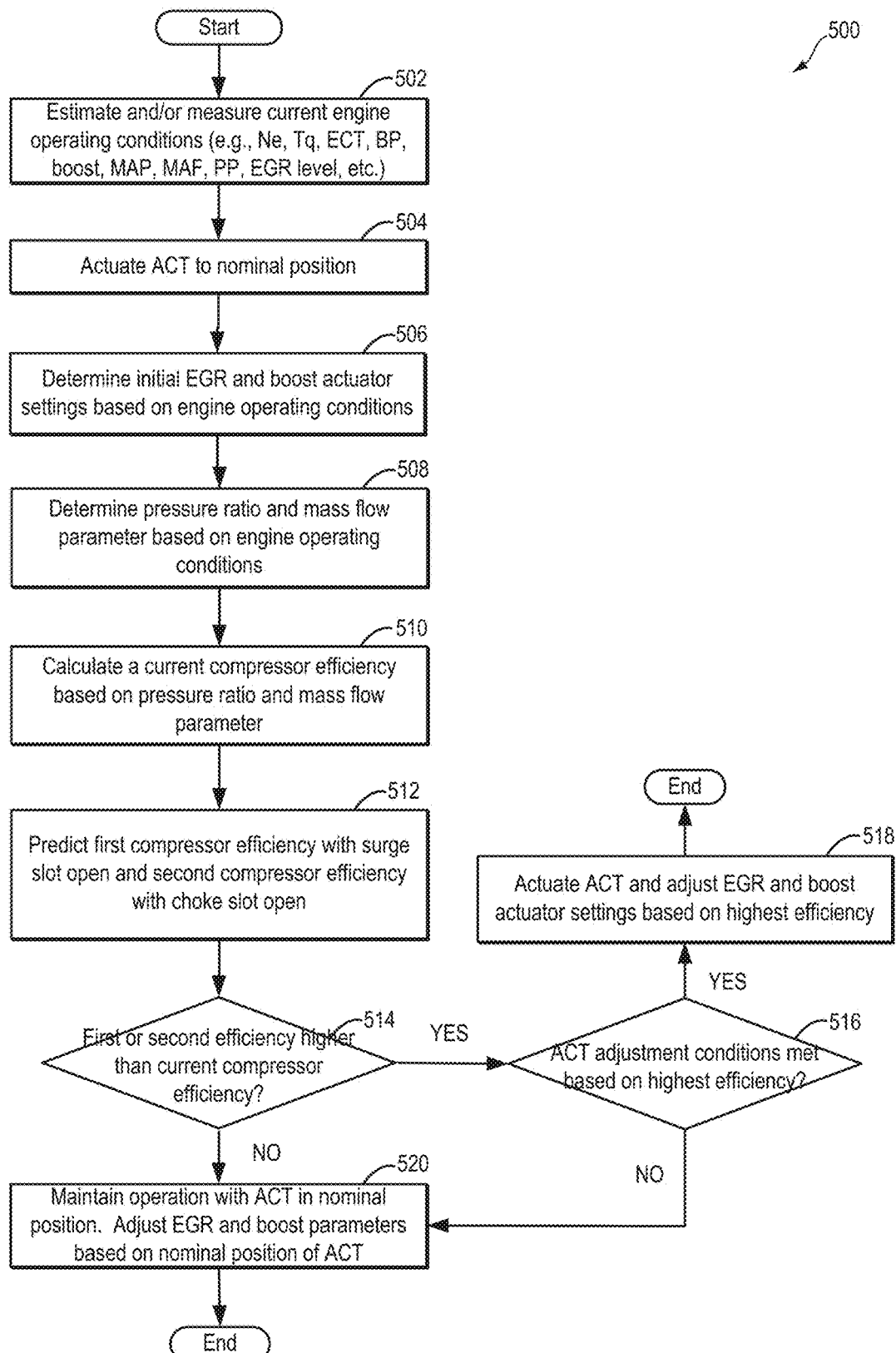
FIG. 5 shows a high level flowchart of a method for predictive control of a turbocharger with an active casing treatment.

Turning now to FIG. 5, a flowchart illustrating an example routine 00 for adjusting an active casing treatment of a turbocharger compressor based on engine operating conditions, a driver model, and a predicted engine load is shown. Instructions for carrying out method 00 and the rest of the methods included herein may be executed by a controller (e.g., controller 12 of FIG. 1) based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below. In one example, the controller may control a position of an active casing treatment (e.g., active casing treatment 310 of FIG. 3) of a turbocharger compressor (e.g., compressor 110 of FIGS. 1-3) based on sensor inputs indicative of a compressor speed, a volumetric flow rate through the compressor, a compressor inlet pressure, and a compressor outlet pressure. Specifically, the controller may receive an indication of compressor speed from a compressor speed sensor (e.g., compressor speed sensor 54 of FIG. 1), an indication of an compressor inlet pressure from a compressor inlet pressure sensor (e.g., pressure sensor 56 of FIG. 1), and an indication of a compressor outlet pressure from a throttle inlet pressure sensor (e.g., TIP sensor 58 of FIG. 1). In one non-limiting example, the controller 12 may determine a pressure ratio using the input data from the aforementioned sensors to determine a pressure ratio (e.g., compressor outlet pressure divided by compressor inlet pressure). Using the pressure ratio and compressor speed, controller 12 may determine compressor operation relative to a surge limit or a choke limit. Responsive to an indication that the compressor is operating within a threshold distance of the surge limit, controller may command an actuator to adjust the position of the active casing treatment in order to increase the opening of a surge slot (e.g., surge slot 312 of FIGS. 3-4B) in order to promote recirculation of air flow through the surge slot into a recirculation passage (e.g., recirculation passage 318 of FIG. 3), then through a recirculation port (e.g., recirculation port 316 of FIG. 3) and back into an intake passage (e.g., intake passage 304 of FIG. 3). Thus, the additional flow of gas may enable the turbocharger compressor to operate with less flow of gas through the compressor before surge occurs. Likewise, responsive to an indication that the compressor is operating within a threshold distance of the choke limit, controller may command an actuator to adjust the position of the active casing treatment in order to increase the opening of a choke slot (e.g., surge slot 314 of FIGS. 3-4B) in order to promote recirculation of air flow through the surge slot from the recirculation passage (e.g., recirculation passage 318 of FIG. 3), and through the recirculation port (e.g., recirculation port 316 of FIG. 3) from an intake passage (e.g., intake passage 304 of FIG. 3). Thus, the additional flow of gas may enable the turbocharger compressor to operate with more flow of gas through the compressor before choke occurs.

At 502, the routine includes estimating and/or measuring engine operating conditions including, but not limited to, engine speed, operator torque demand, engine coolant temperature (ECT), barometric pressure (BP), boost pressure, a manifold absolute pressure (MAP), a mass airflow rate (MAF), an accelerator pedal position (PP), and EGR level (e.g., engine dilution) as may be measured and/or estimated by the output of respective sensors described in reference to FIGS. 1 and 2.

At 504, the routine includes actuating the active casing treatment (ACT) to a nominal position. In one example, the nominal position may be the position in which neither a surge slot (e.g., surge slot 312 of FIG. 3) nor a choke slot (e.g., choke slot 314 of FIG. 3) are open. In other words, the nominal position may correspond to an ACT sleeve position that obstructs each of the openings of the surge slot and the choke slot, not allowing fluidic communication between the intake passage (e.g., intake passage 304 of FIG. 3) and the recirculation passage (e.g., recirculation passage 318 of FIG. 3) of the compressor casing. In this way, air flow entering the compressor intake passage may not be recirculated through the choke slot or the surge slot. In one example, actuating the ACT to a nominal position may include a vehicle controller (e.g., controller 12 of FIG. 3) commanding a signal to an ACT sleeve arm actuator (e.g., arm 313 of FIG. 3) to maintain the nominal position and not move to a first or second position. In one example, the nominal position is the default position of the ACT sleeve.

The routine then proceeds to 506, where the routine includes determining initial EGR and boost actuator settings based on the operating conditions determined at 502. In one example, determining EGR settings may include determining a suitable opening of a low pressure (LP) EGR valve (e.g., EGR valve 243 of FIG. 2). If the engine coolant temperature is below a threshold, for example, the opening of the LP EGR valve may decreased (e.g., closed or fully closed) to decrease recirculation of exhaust gas. In another example, responsive to an indication of acceleration, as may be indicated by actuation of an accelerator pedal, the controller may send a signal to the actuator of the LP EGR valve to decrease the opening of the LP EGR valve. In this way, a decreased amount of exhaust gas may be recirculated from downstream of the turbine to upstream of the compressor during conditions when the engine operates in a mid-high speed-load region. In another example, LP EGR valve opening may be increased when the engine operates in a low-mid speed-load region. In other examples, the engine system (e.g., engine system 100 of FIG. 1) may include one or more of a LP EGR system and a high pressure (HP) EGR system. Those skilled in the art will appreciate that a LP EGR system includes directing exhaust gas from downstream of the turbine (e.g., turbine 116 of FIG. 2) to upstream of the compressor (e.g., compressor 110 of FIG. 2), and that a HP EGR system includes directing exhaust gas from upstream of the turbine to downstream of the compressor. It will be appreciated that the HP EGR system may also include a HP EGR valve to regulate flow through a HP EGR passage, similar to the EGR valve and EGR passage (e.g., EGR valve 243 and EGR passage 241 of FIG. 2) for a LP EGR system. When included, determining EGR settings may further include determining a suitable opening of the HP EGR valve in addition to the LP EGR valve.

For example, LP-EGR may be used only when HP-EGR alone is unable to support the EGR demand. One example EGR control strategy includes adjusting the LP-EGR valve position (in conjunction with the back pressure valve) so as to flow enough LP-EGR to meet the deficit between EGR demand and HP-EGR available. The EGR demand is typically a function of speed and load to manage a trade-off between engine out NOx emission and meeting Torque demand.

In an example embodiment that includes a fixed geometry turbine with a waste-gate and waste-gate valve, determining initial boost actuator settings may include determining a suitable opening of a waste-gate valve (e.g., waste-gate valve 92 of FIG. 1). For example, responsive to a decrease in operator torque demand, such as when the controller receives an indication of an operator pedal tip-out event responsive to an abrupt release of an accelerator pedal (e.g., accelerator pedal 232 of FIG. 2), the controller may send a signal to the actuator of the waste-gate valve in order to increase the opening of the waste-gate valve, thereby increasing the flow of exhaust gas through the waste-gate, bypassing the turbine. By decreasing the amount of exhaust gas flowing through the turbine, the turbine speed may wind down more rapidly and not overwhelm the compressor. As another example, responsive to an increase in operator torque demand, such as when the controller receives an indication of a tip-in event, as may be indicated by depression of the accelerator pedal, the controller may send a signal to the actuator of the waste-gate valve in order to decrease the opening of the waste-gate valve, thereby increasing the flow of exhaust gas through the turbine. By increasing the amount of exhaust gas flowing through the turbine, the turbine speed may spin up more rapidly and expeditiously drive the compressor.

In another example embodiment that includes a variable geometry turbine (VGT), determining initial boost actuator settings may include a controller determining a suitable vane position of the VGT based on engine operating conditions and sending a command to the vanes of the VGT to adjust a blade angle to a desired position. In one example, responsive to an increase in operator torque command, the controller may send a signal to adjust the blade angle to reduce VGT vane opening. In another example, responsive to a decrease in operator torque command, the controller may send a signal to adjust blade angle to increase VGT vane opening.

The routine continues to 508, where the method includes determining a pressure ratio across the turbocharger compressor and a mass flow parameter of the compressor based on engine operating conditions. The compressor pressure ratio may be defined as a ratio of the pressure at the outlet of the compressor relative to the compressor inlet pressure. In one example, the output of a compressor inlet pressure sensor (e.g., pressure sensor 56 of FIG. 1) may provide an indication of the compressor inlet pressure, while the output of a throttle inlet pressure sensor (e.g., TIP sensor 58 of FIG. 1) may provide an indication of the compressor outlet pressure. In one non-limiting example, the controller 12 may determine a pressure ratio using the input data from the aforementioned sensors. The mass flow parameter may include a mass air flow estimate as determined by a MAF sensor coupled to the engine intake, or a mass air pressure estimate as determined by a MAP sensor coupled to the engine intake. Additionally, an indication of barometric pressure (BP) may also be used in determining the volumetric or mass flow rate through the compressor. Using the pressure ratio and volumetric flow rate data, or mass flow rate data, the controller may determine the operating position of the compressor on a compressor map (e.g., compressor map 800 of FIG. 8). For example, the position of the compressor operation related to choke and surge limits of the compressor may be determined.

The routine then continues to 510, where the method includes calculating a current compressor efficiency based on the estimated pressure ratio and mass flow parameters (as determined at 508). In one example, when the ACT is in the nominal position at 610, the current compressor efficiency may be the compressor efficiency associated with operating the compressor with the ACT in the nominal position.

At 512, the method includes predicting a first compressor efficiency with the ACT sleeve's surge slot open, and a second compressor efficiency with the ACT sleeve's choke slot open. For example, the controller may predict an amount of recirculation flow expected across the compressor impeller, at the current pressure ratio and mass flow, through the compressor casing with the ACT sleeve arm actuated to a position where the surge port is open and the choke port is closed and a resultant transition in the compressor efficiency from the current compressor efficiency to a first compressor efficiency. Likewise, the controller may predict an amount of forward flow expected through the compressor impeller, at the current pressure ratio and mass flow, through the compressor casing with the ACT sleeve arm actuated to a position where the choke port is open and the surge port is closed and a resultant transition in the compressor efficiency from the current compressor efficiency to a first compressor efficiency.

At the choke end, further increasing the mass flow rate (when the choke slot is opened), may impact the ability to flow HP-EGR and in such a case, the LP-EGR system may be engaged to make up for the EGR deficit relative to the desired EGR value. Hence the HP-EGR valve and LP-EGR valves may be coordinated accordingly. Near the surge boundary, the ability to flow HP EGR is typically not compromised and the HP-EGR valve and VGT vane may be used to manage surge. During the surge mitigation via the surge slot, the HP-EGR valve may be adjusted to meet the necessary EGR demand under the condition of increased air flow with the surge slot active relative to the case when the compressor would have been in surge.

At 514, the method compares the predicted first and second compressor efficiencies to the current compressor efficiency (determined at 510) and determines if at least one of the first or second efficiencies are higher than the current compressor efficiency with the ACT in the nominal position. If neither the first nor the second predicted efficiency is greater than the current efficiency, then the routine proceeds to 520 where the method includes maintaining operation of the compressor with the ACT in the nominal position. In other words, responsive to the current compressor efficiency being higher, the ACT is maintained in the nominal position and it is inferred that neither surge nor choke assist is required. In addition, EGR and boost actuator settings associated with the ACT in the nominal position are also maintained. In still other examples, the controller may select the maximum of the first, second, and current efficiencies and command a signal to switch to the corresponding mode (normal, choke slot open, or surge slot open) by actuating the ACT accordingly.

If, at 514, the predicted first or the second efficiency is higher than the current compressor efficiency, then it may be inferred that the compressor operation is moving towards a surge or a choke limit (based on the higher of the predicted first and second compressor efficiency). Upon confirming, at 516, the method includes determining whether ACT adjustment conditions are met. It will be appreciated that based on the highest of the first and second efficiency, ACT adjustment conditions may be different. In order to reduce the likelihood of flow pulsations and efficiency degradation associated with each ACT adjustment, the frequency of ACT actuation may be limited. In one example, ACT adjustment conditions may be confirmed if a threshold duration has elapsed since a last ACT actuation. In another example, ACT adjustment conditions may include one or more of engine coolant temperature being within a specified temperature range, vehicle speed being within a specified speed range, engine load being within a specified load window, and transient boosted engine operation being within a specified boost pressure range.

For example, the first efficiency may be the efficiency estimated at the surge line at the given operating point (pressure ratio). The second efficiency may be assessed from the choke line associated with the given operating point.

As an example, the surge margin may be determined as:

$$\text{Surge margin} = (\text{massFlowRate\_nom} - \text{massFlowRate\_surgeLine}) / (\text{massFlowRate\_nom}),$$

where massFlowRate_nom is the nominal mass flow rate, and massFlowRate_surgeLine is the mass flow rate at the surge line. All mass flows may be calculated at the same corrected compressor speed from the compressor map. A choke margin may be similarly determined. A decision threshold for these margins (as to when to actuate the ACT) can then be set at a value determined as a function of fresh air demand and altitude. A map-based approach allows flexibility in introducing a non-linear threshold, such as a fixed offset (margin) at some conditions, and linearly varying offsets (e.g., proportional to flow at surge) at other conditions. For example, a fixed margin threshold (offset) may be set at the low flow conditions. Efficiency measures may also be used and are similarly derived from the compressor map for the surge and choke locations and compared to the efficiency at the current operating point. A rate of decrease in these margins (mass flow based or efficiency based) along with the threshold margin may also be used to trigger ACT actuation.

If the ACT adjustment conditions corresponding to the highest of the first and second efficiency are met, then the routine proceeds to 518, where the routine includes actuating the ACT to the position corresponding to the highest of the predicted first and second efficiency. Also at 518, the method includes adjusting EGR and boost actuator settings based on the selected ACT position to operate the compressor with the highest efficiency. In one example, if the current efficiency for a given operating condition is 0.70, and a first predicted compressor efficiency for an open ACT surge slot is 0.75, and a second predicted compressor efficiency for an open ACT choke slot is 0.65, then the controller may infer that the compressor may become surge limited and accordingly may command that the ACT arm be actuated to adjust the ACT sleeve position to the position where the surge slot is open because that configuration offers the highest possible efficiency for the given operating condition. Responsive to actuating the ACT to the position where the surge slot is open, the controller may command an adjustment to one or more of the EGR valve and boost actuator settings in order to maintain combustions stability and compressor efficiency, as well as to control emissions. For example, while operating with the surge slot open, a waste-gate valve opening may be increased to reduce exhaust flow through the turbine and an HP-EGR valve opening may be decreased to decrease high pressure exhaust recirculation to the intake. In another example, if the current efficiency for a given operating condition is 0.70, and the first predicted compressor efficiency for an open ACT surge slot is 0.65, and the second predicted compressor efficiency for an open ACT choke slot is 0.75, then the controller may infer that the compressor may become choke limited and accordingly may command that the ACT arm be actuated to adjust the ACT sleeve position to the position where the choke slot is open because that configuration offers the highest possible efficiency for the given operating condition. Responsive to actuating the ACT to the position where the choke slot is open, the controller may command an adjustment to one or more of the EGR valve and boost actuator settings in order to maintain combustions stability and compressor efficiency, as well as to control emissions. For example, while operating with the choke slot open, a waste-gate valve opening may be decreased to increase exhaust flow through the turbine and an HP-EGR valve opening may be increased to increase high pressure exhaust recirculation to the intake. In this way, the controller may include logic that compares the compressor efficiencies at open slot and closed slot conditions to determine if a change of state of the ACT is required.

If ACT adjustment conditions are not met at 516, then the method moves to 520, where turbocharger operation is maintained with the ACT in the nominal position before the routine ends. Herein, even if a higher efficiency can be provided by actuating the ACT position, the ACT is maintained in the nominal position to reduce exhaust flow pulsations and NVH issues. It will be appreciated that maintaining operation with the ACT in the nominal position may also include maintaining current or initial EGR and boost actuator settings (such as those determined at 506).

In this way, by adjusting slot control (opening or closing) via ACT sleeve position adjustments in response to changes in driver demand (which result in changes in boost demand), the driver demand may be satisfied without adversely affecting compressor performance. Turning now to FIG. 6, method 600 depicts another embodiment of a method for controlling an ACT position to increase turbocharger compressor efficiency. Method 600 may also depict an example implementation of the control routine of FIG. 5 responsive to a determined or predicted choke or surge condition.

At 602, the routine includes estimating and/or measuring engine operating conditions including, but not limited to, engine speed, operator torque demand, engine coolant temperature (ECT), barometric pressure (BP), boost pressure, ACT position, a manifold absolute pressure (MAP), a mass airflow rate (MAF), an accelerator pedal position (PP), and EGR level (e.g., engine dilution) as may be measured and/or estimated by the output of one or more sensors, such as those described with reference to FIGS. 1 and 2.

At 604, as at 504, the routine includes actuating the active casing treatment (ACT) to a nominal position. In one example, actuating to the nominal position of the ACT may include the controller sending a command signal to an actuator coupled to the arm of the ACT sleeve to move the ACT sleeve to a first position where both the surge slot and the choke slot of the ACT are closed. As a result, charge flow through the compressor impeller is maintained at nominal levels.

At 606, as at 506, the routine includes determining initial desired EGR and boost actuator settings based on the estimated and/or measured engine operating conditions including the nominal position of the ACT. Determining initial desired EGR settings may include determining LP and HP EGR valve settings, such as based on a look-up table stored in the controller's memory as a function of engine speed and load. Therein, the engine speed and load are used as inputs and a target EGR valve position is provided as output. The controller may then send a command signal to the LP and HP EGR valve actuators to move them to the target settings.

At 607, the method includes dynamically updating the choke and surge margins of the compressor (herein a variable geometry compressor, or VGC) based on various drive parameters. The various drive parameters may include drive conditions, such as road grade, altitude, ambient temperature and humidity, terrain, local weather conditions, traffic conditions, etc. In addition, the various drive parameters may include driver behavior on the current drive cycle, as well as a drive history of the driver including energy density of driver pedal demand.

In one example, altitude and road grade may be established ahead of time if preview (look ahead) information is available, such as available in the case of connected vehicles using V2V, V2I, GPS, or related technology. Thus given a route of travel, the controller may establish the road grade and altitudes achieved over the route from mapping and localization data. If preview information is not available, the information may be retrieved via a navigation system of the vehicle. For example, a current GPS location retrieved from an in-vehicle navigation system may be used to determine altitude and road grade profile in real-time. Altitude can also be determined from on-board barometric pressure measurements. Hence a determination of the current altitude, as well as the current rate of change of altitude, if measurably significant, may allow a prediction of the expected altitude over a given projection window of the route (e.g., over a predetermined distance or duration ahead of the current position along the planned route).

In one example, responsive to a predicted increase in road grade due to upcoming uphill travel, the controller may infer increased load and increased altitude where the compressor is likely to become choke limited. Accordingly, the controller may increase the choke margin to the choke limit while maintaining the surge margin to the surge limit. As a result, the ACT may be actuated to the position where the choke slot is open earlier in the drive cycle, and may be held at the choke slot until later in the drive cycle. As another example, responsive to a predicted decrease in road grade due to upcoming downhill travel, the controller may infer decreased load where the compressor is likely to become surge limited. In particular, there may be a transient operation from high load to low load which can lead to fast transitions to low air flow rates causing the compressor to operate surge limited. Accordingly, the controller may increase the surge margin to the surge limit while maintaining the choke margin to the choke limit. As a result, the ACT may be actuated to the position where the surge slot is open earlier in the drive cycle and may be held at the surge slot until later in the drive cycle.

This operation can be modified with driver behavior learnt (through pedal action) over a period prior to the current state on the same drive cycle, as well as prior drive history over one or more additional drive cycles prior to the current one. In this regard, a continuous time series of the energy density of the driver's pedal demands can be maintained over consecutive time windows. The pedal energy density for a driver may be calculated over a drive duration based on a frequency of accelerator and brake pedal application, a duration of accelerator and brake pedal application, as well as a distance or degree by which the pedal is depressed when the pedals are applied. The driver behavior may also be filtered to allow for a smooth engage/disengage profile.

For example, the energy density can be calculated using the equation:

$$E = \int_0^T |x^2| dt,$$

wherein x is the pedal position. Based on the E metric, a barrier function can be designed to impact the frequency of actuation of the ACT. For high values of f(E), the ACT may be allowed to operate with its full available bandwidth. For low values of (E), slower transitions in ACT positions can be enforced by enforcing a de-bouncing (delay) or by controlling the bandwidth of ACT actuation to low values. Hence if we consider a simple first order actuation model:

$$\theta = \frac{U}{\tau S + 1},$$

then the bandwidth may be controlled through the parameter τ, as a function of E directly or modified based on the barrier function f(E). Note that increasing the surge margin will have a similar effect in that it will cause the ACT to engage the surge slot earlier and release it later thereby reducing the transition frequency. The Barrier function approach additionally provides smoother transitions between ACT positions by limiting the frequency of ACT operation.

Figure 10:
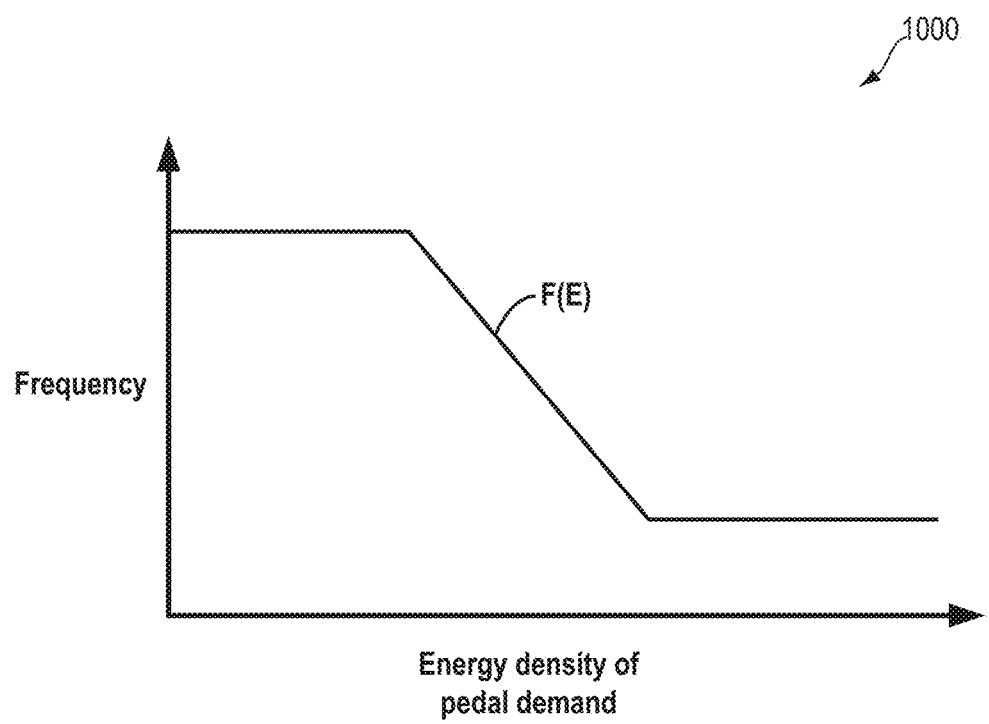
FIG. 10 shows an example barrier function that may be used for modifying ACT operation frequency.

An example barrier function is shown at map 1000 of FIG. 10. The function (F(E)) is used as a modifier for varying the frequency of ACT operation.

High pedal energy densities may be learned when the operator applies the accelerator pedal and brake pedal frequently, and/or applies the pedals to a higher degree. The higher pedal energy density may imply aggressive drive behavior and that the compressor is more likely to go into surge. Responsive to drive behaviors including a higher pedal energy density, the controller may increase the surge margin to the surge limit, causing the ACT to be actuated to the position where the surge slot is opened earlier to provide greater surge protection. In addition, the ACT may be held in the surge slot longer, such as even after surge is addressed in anticipation of recurrent surge.

It will be appreciated that each of the choke margin and the surge margin may be further adjusted, dynamically, based on a measured frequency of sleeve actuation over the drive cycle. As elaborated below, the surge margin may be increased and the choke margin may be decreased as the measured frequency exceeds a threshold frequency. For example, if the surge slot is actuated very frequently then the margin may be increased. Increasing the surge margin may have a similar effect in that it will cause the ACT to engage the surge slot earlier and release it later, thereby reducing the transition frequency.

Determining initial desired boost actuator settings may include determining a suitable opening of a waste-gate valve and/or a target blade angle for a VGT, such as based on a look-up table stored in the controller's memory as a function of engine speed and load. Therein, the engine speed and load are used as inputs and a target waste-gate valve position or blade angle is provided as output. The controller may then send a command signal to the waste-gate valve or VGT actuator to move them to the target settings.

At 608, the routine includes determining whether there is a detected or a predicted torque increase. In one example, a detected torque increase may be the result of a tip-in, as indicated by an increased actuation of an accelerator pedal. A predicted torque increase may occur responsive to input signals from one or more remote sources external to the vehicle (e.g., external network cloud, other vehicles, infrastructure) using one or multiple technologies (e.g., wireless communication, navigation system, GPS, V2V, V2I). In this way, various kinds of data, including but not limited to gradient map data and upcoming traffic conditions may be exchanged among vehicles and the network cloud and this data may be utilized for predicting a future engine operating condition. In one example, based on input from a navigation system (e.g., navigation system 154 of FIG. 1), the controller may recognize an intended travel route (e.g., based on previous driving history along the same route). Specifically, controller may "learn" that at a particular location on the route, a steep gradient exists and the driver predictably will downshift and/or increase acceleration to maintain a suitable speed on the gradient. In this way, the controller may store this "predictability" of a driver's habits and other information as a driver model, and use this driver model in conjunction with predicted route, gradient, and elevation information to predict future engine operating conditions. Responsive to an indication that the vehicle location is nearing the location of the gradient, the controller may indicate that a torque increase is predicted.

If there is no detected or predicted torque increase, the routine continues to 610, where the routine includes determining whether there is a detected or predicted torque decrease. A detected torque decrease may occur as a result of an operator decreasing the actuation of the accelerator pedal (e.g., tip-out), or as a result of the vehicle traveling along a route that has a sudden decrease in gradient. In one example, this may include a vehicle traveling up a steep gradient (e.g., up a hill) and suddenly reaching the crest of the hill, requiring a decreased amount of torque to maintain the desired vehicle speed.

If there is no detected or predicted torque decrease, the routine continues to 612, where the compressor continues operation with the ACT in the current position. In the depicted example, the current position may be the default, nominal position.

If the controller receives indication of a detected or predicted torque decrease, the routine proceeds to 622, where the routine includes determining whether a surge condition is detected or predicted. A surge condition may be indicated by an air mass flow rate below a threshold, as indicated by a mass air flow sensor (e.g., MAF sensor 57 of FIG. 1). During a surge condition, air flow through the compressor may stall and reverse, leading to instability of the compressor and loss of power as a result of degraded compressor performance. In one example, surge may occur when a throttle is closed responsive to a tip-out after a boosted engine condition, known as tip-out surge. In other examples, surge may be caused in part by high levels of cooled low-pressure exhaust gas recirculation (LP EGR) entering upstream of the compressor. High levels of EGR may increase compressor pressure while decreasing mass flow through the compressor causing the compressor to operate inefficiently or in the surge region.

If a surge condition is detected, the routine then continues to 624, where the controller determines whether the threshold frequency of ACT actuation has been met. In order to avoid compressor flow pulsations and the resulting efficiency losses causes by frequent ACT actuation events, if frequency of ACT actuation is already at a threshold level, further ACT actuation is delayed. Accordingly, if the threshold frequency of ACT actuation has been met, the method moves to 617 to delay ACT actuation. In one example, ACT actuation may be delayed until a threshold duration has elapsed since a last ACT actuation. If a surge condition is not detected, the current ACT position is maintained at 615.

In one example, the threshold reflects a prior frequency of sleeve actuation and is determined as a function of the estimated energy density of driver pedal demand. For example, the threshold may be lowered as the estimated energy density increases.

If the threshold frequency of ACT actuation has not been met, then the routine proceeds to 626 to actuate the ACT to a position where the surge slot (e.g., surge slot 312 of FIG. 3) is open. In one example, actuating the ACT to open the surge slot includes the controller sending a command signal to an actuator coupled to an ACT sleeve arm to actuate the ACT sleeve to a first position where the sleeve slot is aligned with the surge slot of the casing. As a result, the surge slot is opened while the choke slot is held closed. By virtue of opening of the surge slot during low mass flow conditions when surge is predicted or detected, the active casing treatment may enable gas to flow from the compressor intake passage, past the impeller blades, through the surge slot, then through a recirculation passage and finally through a recirculation port back into the compressor intake passage. Thus, the flow of gas striking the leading edge of a full blade of the compressor may be greater than without an increased opening of the surge slot. The additional recirculation flow may enable the turbocharger compressor to operate with less flow of gas through the compressor impeller before surge occurs. As a result of actuating the ACT in order to open the surge slot, compressor performance near surge conditions may be improved.

Next, at 628, the routine includes adjusting the EGR flow and the expansion through the turbocharger in order to mitigate any flow and boost pressure disturbances caused by actuation of the ACT, thereby enabling a substantially constant flow to be maintained through the ACT actuation. In one example, adjusting the EGR flow responsive to ACT actuation to a position where the surge slot is opened includes increasing the opening of the LP EGR valve (to increase recirculation of low pressure exhaust gas to a location upstream of the compressor) and decreasing the opening of the HP EGR valve (to decrease recirculation of high pressure exhaust gas to a location downstream of the compressor). Adjusting the expansion through the turbocharger may include increasing the opening of a waste-gate valve of a fixed geometry, waste-gated turbine to decrease exhaust flow through the turbine (and increase exhaust flow bypassing the turbine). Alternatively, adjusting the expansion through the turbocharger may include increasing the blade angle for vanes of a variable geometry turbine. In this way, the opening of the waste-gate valve may not have to be opened to the extent that it would have without ACT actuation. After 628, the routine ends.

In one example, by coordinating the adjustments of the ACT position with EGR and boost actuators adjustments, surge can be addressed using less aggressive actuator adjustments. For example, surge can be addressed by increasing the opening of the waste-gate valve to a partially open position, without having to fully open the waste-gate valve (as would have been required if ACT position adjustments were not applied). Likewise, surge can be addressed by decreasing the opening of the HP EGR valve to a partially open position, without having to fully close the HP EGR valve (as would have been required if ACT position adjustments were not applied). As a result, the turbine speed may not drop rapidly. If the driver has a change of mind during the tip-out (that induced the surge), or if there is a tip-in soon after the tip-out, the waste-gate valve may quickly actuated to a fully closed position and turbine spin-up can be provided faster. Likewise, the HP EGR valve can be quickly actuated to a fully open position and compressor outlet pressure can be rapidly raised.

Returning to 608, if a detected or predicted torque increase is confirmed, the routine continues to 614 to determine whether a choke condition has been detected or predicted. A choke condition may occur when the air flow mass flowing through the compressor cannot be increased for a given speed of the compressor. The flow rate into the compressor may be limited by the size of the compressor inlet, and when the flow at the inlet reaches sonic velocity, the flow through the compressor may not be increased further. A choke condition may be detected based on sensor input from a mass air flow sensor being above a threshold flow. In addition, choke condition may be indicated based on a pressure ratio across the compressor relative to a compressor map. Based on the pressure ratio, if the compressor is within a choke margin (or less than a threshold distance) of a choke limit, then choke may be predicted. In one example, choke may be predicted when the engine is operating with a high load, such as in the case of trailer towing. As another example, choke may be predicted when the engine is operating at high altitudes with increased loads, such as during a hill climb.

If a choke condition is detected, the routine then continues to 616, where the controller determines whether the threshold frequency of ACT actuation has been met. In order to avoid compressor flow pulsations and the resulting efficiency losses causes by frequent ACT actuation events, if frequency of ACT actuation is already at a threshold level, further ACT actuation is delayed. Accordingly, if the threshold frequency of ACT actuation has been met, the method moves to 617 to delay ACT actuation. In one example, ACT actuation may be delayed until a threshold duration has elapsed since a last ACT actuation. If a choke condition is not detected, the current ACT position is maintained at 615.

In one example, the threshold reflects a prior frequency of sleeve actuation and is determined as a function of the estimated energy density of driver pedal demand. For example, the threshold may be lowered as the estimated energy density increases.

If the threshold frequency of ACT actuation has not been met, then the routine proceeds to 628 to actuate the ACT to a position where the choke slot (e.g., surge slot 314 of FIG. 3) is open. In one example, actuating the ACT to open the choke slot includes the controller sending a command signal to an actuator coupled to an ACT sleeve arm to actuate the ACT sleeve to a second position where the sleeve slot is aligned with the choke slot of the casing. As a result, the choke slot is opened while the surge slot is held closed. By virtue of opening of the choke slot during high mass flow conditions when choke is predicted or detected, the active casing treatment may enable gas to flow from the compressor intake passage, through the recirculation passage, through the recirculation port, and through the choke slot. Thus, the flow of gas striking the leading edge of a full blade of the compressor may be less than without an increased opening of the choke slot. The diversion of the incoming flow of gas may enable the turbocharger compressor to operate with a higher flow of gas through the compressor before choke occurs. As a result of actuating the ACT in order to open the choke slot, compressor performance near choke conditions may be improved.

Next, at 620, the routine includes adjusting the EGR flow and the expansion through the turbocharger in order to mitigate any flow and boost pressure disturbances caused by actuation of the ACT, thereby enabling a substantially constant flow to be maintained through the ACT actuation. In one example, adjusting the EGR flow responsive to ACT actuation to a position where the choke slot is opened includes decreasing the opening of the LP EGR valve (to decrease recirculation of low pressure exhaust gas to a location upstream of the compressor) and increasing the opening of the HP EGR valve (to increase recirculation of high pressure exhaust gas to a location downstream of the compressor). Adjusting the expansion through the turbocharger may include decreasing the opening of a waste-gate valve of a fixed geometry, waste-gated turbine to increase exhaust flow through the turbine (and decrease exhaust flow bypassing the turbine). Alternatively, adjusting the expansion through the turbocharger may include decreasing the blade angle for vanes of a variable geometry turbine. After 620, the routine ends.

In one example, by coordinating the adjustments of the ACT position with EGR and boost actuators adjustments, choke can be addressed using less aggressive actuator adjustments. For example, choke can be addressed by decreasing the opening of the waste-gate valve to a partially open position, without having to fully close the waste-gate valve (as would have been required if ACT position adjustments were not applied). Likewise, choke can be addressed by increasing the opening of the HP EGR valve to a partially open position, without having to fully open the HP EGR valve (as would have been required if ACT position adjustments were not applied). As a result, if the driver has a change of mind during the tip-in (that induced the choke), or if there is a tip-out soon after the tip-in, the waste-gate valve may quickly actuated to a fully open position and turbine spin-down can be provided faster. Likewise, the HP EGR valve can be quickly actuated to a fully closed position and compressor outlet pressure can be rapidly lowered.

Due to the ACT actuation to the surge slot at 618 or the choke slot at 626, the flow and pressure ratio across the compressor changes, causing a position of the compressor's efficiency curve on a compressor map to also change, as discussed below with reference to FIG. 8. Feedback controllers for EGR flow rate and boost pressure may then actuate the EGR valve and variable geometry turbo (VGT) to compensate for these changes, as discussed above at 620 and 628. A change in VGC position due to the ACT adjustment may therefore temporarily disturb the engine gas flow properties away from their desired set-points (such as the initial settings determined at 606). Therefore, control actions may need to account for the impact of ACT actuation on regular air path parameters.

It will be appreciated that while the examples discussed at 620 and 628 pertain to EGR flow through an EGR valve (HP and/or LP EGR valve), in still other examples, air flow may be actuated by an intake throttle in addition to the EGR valve to compensate for the disturbances caused by the ACT actuation.

In one example, this disturbance is pre-empted by calculating an adjustment to the EGR valve and VGT (blade angle and/or waste-gate valve position) when the ACT is actuated to bring it close to the final predicted and optimal position. If the expected change in mass air flow (or EGR flow, if that is the feedback control variable) and boost pressure (or exhaust pressure, if that is the feedback control variable) is depicted as:

$$\begin{bmatrix} \Delta F \\ \Delta p \end{bmatrix} = \begin{bmatrix} dF/dvgc \\ dp/dvgc \end{bmatrix} \Delta vgc = B \Delta vgc$$

respectively, and if the sensitivity of dF, dp with respect to EGR valve and VGT actuation is depicted as:

$$\begin{bmatrix} \Delta F \\ \Delta p \end{bmatrix} = \begin{bmatrix} dF/degrv & dF/dvgt \\ dp/dvgt & dp/dvgt \end{bmatrix} \begin{bmatrix} \Delta egr \\ \Delta vgt \end{bmatrix} = A \cdot \begin{bmatrix} \Delta egr \\ \Delta vgt \end{bmatrix}$$

then the controller may adjust the EGR and VGT position by applying the following equation:

$$\begin{bmatrix} \Delta egr \\ \Delta vgt \end{bmatrix} = A^{-1} B \cdot \Delta vgc$$

This adjustment will largely correct for the disturbance that the ACT actuation causes and maintain constant pressure flow during the ACT adjustment. The adjustment may not be perfect, and the feedback controller may still have to ensure exact regulation, however, the adjustment enables most of the disturbance to be corrected.

Also at 620 and 628, the controller may adjust exhaust flow through the turbine to compensate for a predicted change in boost pressure to the actuation of the sleeve. For example, responsive to the sleeve being actuated to a first, surge position, the controller may decrease a blade or nozzle angle of the variable geometry turbine, the decreasing based on a predicted change in boost pressure due to the actuating of the sleeve to the first position. In comparison, responsive to the sleeve being actuated to the second, choke position, the controller may increase a blade angle of the variable geometry turbine, the increasing based on the predicted change in boost pressure due to the actuating of the sleeve to the second position. Increasing flow with the choke slot open may reduce boost pressure. Hence, if the boost pressure deviation is more than desired, the turbocharger speed may be increased via VGT vane control (to or towards the closed position) to achieve the desired boost set-point. In the case of the surge slot being open, the objective may be to reduce the boost pressure and get the compressor out of surge. In such cases, the turbocharger speed may be reduced via VGT vane opening.

In this way, a controller may dynamically adjust each of a choke margin to a choke limit and a surge margin to a surge limit of a compressor based on driver behavior including energy density of driver pedal demand; actuate a sleeve of an active casing of the compressor to a choke slot responsive to compressor operation in the choke margin; and actuate the sleeve to a surge slot responsive to compressor operation in the surge margin. The actuating may be performed responsive to a change in driver pedal demand, and the controller may further estimate the energy density of the driver pedal demand based on each of a rate, a magnitude, and a frequency of driver pedal application over a drive cycle. The controller may further adjust each of an EGR actuator and a boost actuator based on the actuating to operate the compressor out of the choke margin or surge margin. In one example, the EGR actuator includes one or more of a high pressure EGR valve recirculating exhaust gas from upstream of an exhaust turbine to downstream of the compressor, and a low pressure EGR valve recirculating exhaust gas from downstream of the exhaust turbine to upstream of the compressor, and the boost actuator includes one of a waste-gate valve for flowing exhaust gas to a tailpipe while bypassing the turbine, and a variable geometry turbine actuator for adjusting a blade angle of the turbine nozzles.

The adjusting may include, responsive to the sleeve being actuated to the choke slot, decreasing an opening of the low pressure EGR valve, increasing an opening of the high pressure EGR valve, decreasing an opening of the waste-gate valve, and decreasing the nozzle angle; and responsive to the sleeve being actuated to the surge slot, increasing the opening of the low pressure EGR valve, decreasing the opening of the high pressure EGR valve, increasing the opening of the waste-gate valve, and increasing the nozzle angle. Herein, each of the choke margin and the surge margin may be further adjusted, dynamically, based on a measured frequency of sleeve actuation of the drive cycle, the surge margin increased and the choke margin increased as the measured frequency exceeds a threshold frequency. Increasing the surge margin reduces frequent surge slot actuation. Likewise, increasing the choke margin engages the choke slot earlier and reduces drive pedal pumping.

FIG. 7 shows an example block diagram 700 of variable geometry compressor control in a turbocharged engine for reducing compressor surge and choke. The control system includes a first sub-loop including dynamic models and estimators shown at 702, control logic and arbitration is performed at second sub-loop 704, and actuation and sensing data is collected at third sub-loop 706. Each of the first and second sub-loops are configured to receive input from a human driver 708.

At the first sub-loop 702, based on available measurements, a compressor pressure ratio and compressor mass flow are calculated. These are then used to localize the compressor operating point on a compressor map using dynamic models and predictors. For example, the dynamic models and predictors and used to determine whether the compressor is expected to become surge limited or choke limited in real-time, as operating conditions change. In addition, based on input from the human driver 708, including based on the driver's pedal application frequency and degree, an energy density of the driver's pedal demands may be determined and used to dynamically update the models and predictors.

At second sub-loop 704, local surge and choke margins are determined based on the dynamic models and predictors. This is then used for ACT actuation control. In addition, the choke and surge margins as well as the surge and choke limits (e.g., surge and choke limit curve characteristics) may be updated based on input regarding the driver behavior, such as based on the energy density of the driver's pedal demands. This enables the controller to better anticipate surge and choke conditions and adjust the ACT actuation control accordingly. For example, ACT actuation to surge or choke positions may be enabled earlier in a drive cycle and maintained for a longer part of the drive cycle responsive to aggressive driver behavior. In addition, the ACT actuation control may be adjusted based on air path interactions, such as based on disturbances caused in EGR flow and intake air flow. Further, the ACT actuation control may be adjusted so that the actuation frequency does not exceed a threshold frequency to reduce flow pulsations and compressor efficiency loss.

The ACT actuation control may be performed based on input regarding a current ACT position, as sensed by the sensors coupled to the third sub-loop 706. Still other sensor input may also be received. The ACT actuation control output may include a control signal that is delivered to an ACT actuator, such as an ACT driver, also coupled to the third sub-loop 706. This enables ACT actuation following which an updated ACT position signal is sensed and indicated to the ACT actuation control.

In this way, surge and choke margins may be dynamically updated based on vehicle operating conditions and driver behavior, and ACT actuation can be adjusted to reduce surge and choke events while improving compressor efficiency.

Figure 8:
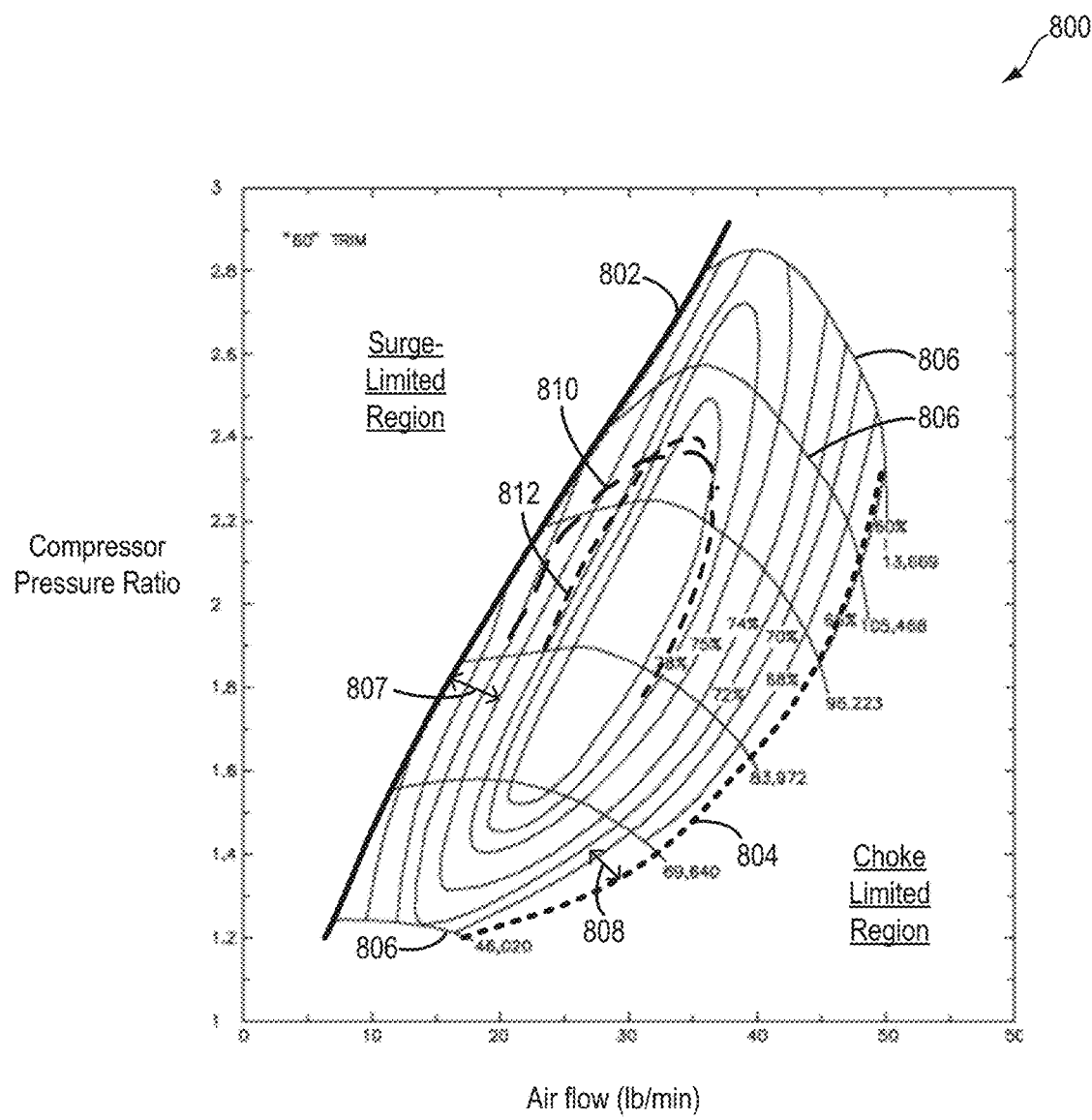
FIG. 8 shows an example compressor pressure ratio map including surge and choke limits.

Turning now to FIG. 8, an example compressor map 800 is shown. A compressor map is a graph that schematically depicts the performance characteristics of a particular compressor, including efficiencies, mass flow ranges, and boost pressure capability. Map 800 shows compressor pressure ratio (along the y-axis) at different compressor flow rates (along the x-axis) for a turbocharger compressor. Line 802 (solid) shows a surge limit (e.g., a hard surge limit) for the turbocharger compressor while line 804 (dashed) shows a choke limit for the turbocharger compressor. Solid lines 806 (only 3 are labeled) depict the constant speed lines of the turbocharger compressor. Compressor operation to the left of surge limit results in turbocharger compressor operation in a surge region. Likewise, compressor operation to the right of choke limit 804 results in turbocharger compressor operation in a choke region. Compressor operation in both the surge region and the choke region results in objectionable NVH and potential degradation of boosted engine performance. In one example, the localization of the compressor operating point on the compressor map may be based on compressor flow information (as inferred from a MAF or MAP sensor), compressor pressure information (as inferred from a CIP, TIP, or boost pressure sensor), and ACT position information (such as inferred from an ACT position sensor). Alternatively, the parameters may be estimated based on engine operating conditions.

A controller may determine a surge margin to the surge limit and a choke margin to the choke limit based on engine operating conditions including driver behavior and drive history. For example, the controller may determine a surge margin 807 which is a location on the compressor map that is a threshold distance from surge limit 802. When the compressor operates outside of the surge margin 807, such as when the compressor is operating at higher than the threshold distance from the surge limit 802, no surge is detected or predicted. However, when the compressor operates inside of or within surge margin 807, such as when the compressor is operating at lower than the threshold distance from the surge limit 802, surge is anticipated or predicted. At that time, the controller may move the compressor further away from the surge limited region by actuating the ACT to the surge slot, as discussed earlier. As one example, a compressor may be operating along compressor efficiency curve 810, within the surge margin 807. Responsive to the inference of imminent surge, the controller may actuate the ACT of the variable geometry compressor to vary the flow through the compressor, thereby moving the compression operation to compressor efficiency curve 812, outside surge margin 807.

As another example, the controller may determine a choke margin 808 which is a location on the compressor map that is a threshold distance from choke limit 804. When the compressor operates outside of the choke margin 808, such as when the compressor is operating at higher than the threshold distance from the choke limit 804, no choke is detected or predicted. However, when the compressor operates inside of or within choke margin 808, such as when the compressor is operating at lower than the threshold distance from the choke limit 804, choke is anticipated or predicted. At that time, the controller may move the compressor further away from the choke limited region by actuating the ACT to the choke slot, as discussed earlier.

It will be appreciated that the choke margin to the choke limit may differ from the surge margin to surge limit in magnitude, the margins varied based on operating conditions and driver behavior. As one example, when the drive history indicates that the driver has an aggressive driving behavior (e.g., the driver has a tendency to alternate between applying the accelerator pedal and the brake pedal frequently, and/or the driver depresses the brake pedal and accelerator pedal to a higher degree, on average), the controller may infer that the compressor is more prone to surge conditions (due to frequent tip-outs and tip-ins). Accordingly, the controller may increase the surge margin to the surge limit while maintaining the choke margin to the choke limit. Alternatively, both the surge margin to the surge limit and the choke margin to the choke limit may be increased, a degree of increase for each adjusted based on the drive history. For example, as the frequency of pedal application increases on a drive cycle, the margin(s) may be increased further. In another example, when the vehicle is operated at higher altitudes (such as when towing at higher altitudes), the controller may infer that the compressor is more prone to choke conditions. This is due the lower oxygen level of the ambient air at the higher altitudes causing the compressor to operate closer to the choke limit. Accordingly, the controller may increase the choke margin to the choke limit while maintaining the surge margin to the surge limit. In this way, the surge margin and the choke margin may be dynamically modeled.

In still further examples, each of the choke margin and the surge margin may be further adjusted, dynamically, based on a measured frequency of sleeve actuation over the drive cycle. For example, the surge margin may be increased and the choke margin may be increased as the measured frequency exceeds a threshold frequency.

Figure 9:
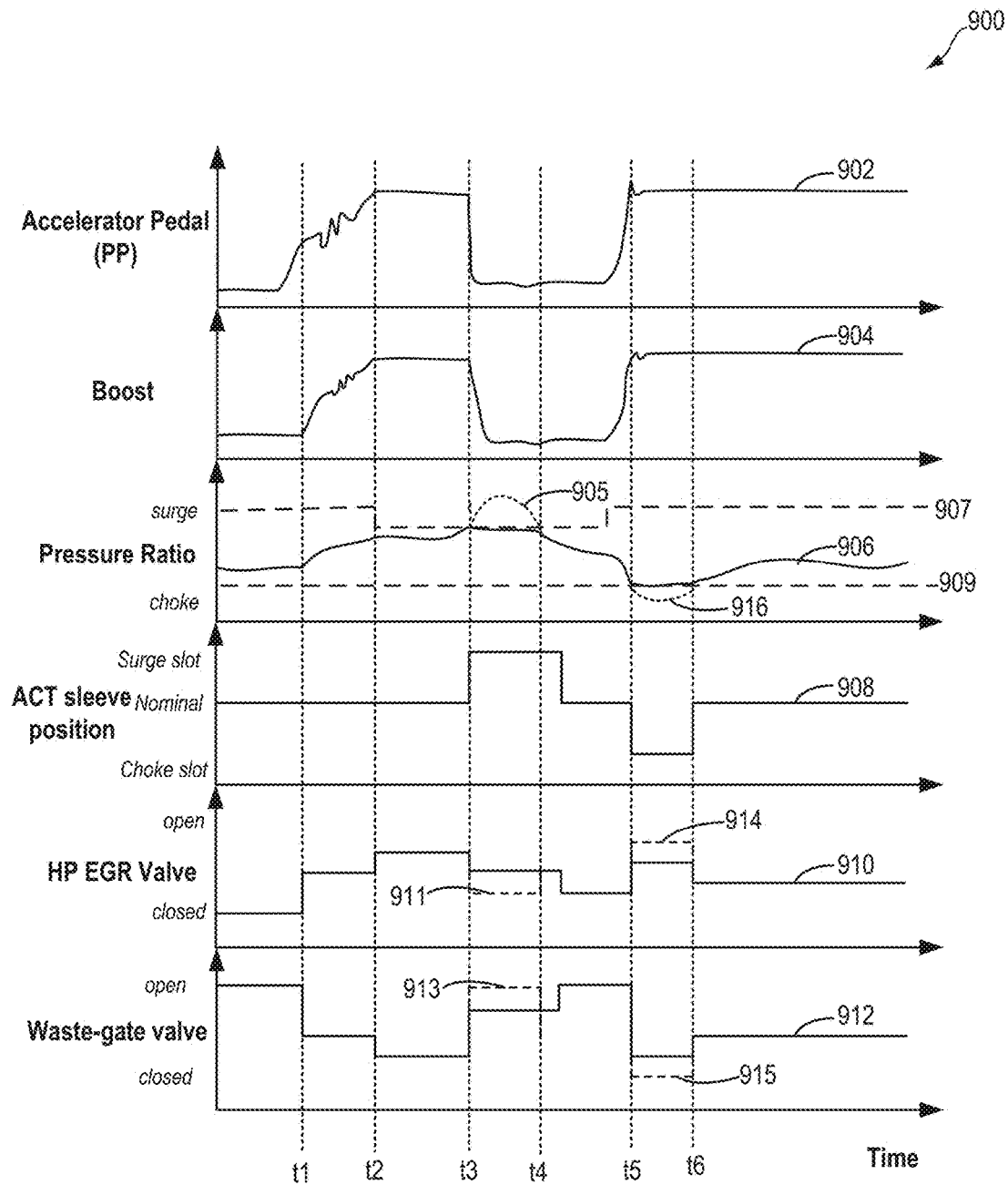
FIG. 9 shows a prophetic example of turbocharger operation with ACT sleeve adjustments to mitigate surge and choke.

Turning now to FIG. 9, map 900 depicts an example operation of a turbocharged engine system including adjustments to the geometry of a variable geometry compressor (VGC) of the turbocharger to reduce surge limited and choke limited compressor operation. The geometry of the VGC is adjusted via actuation of an ACT of the compressor. Map 900 includes various engine parameters along the vertical axis, and elapsed time along the horizontal axis. Map 900 depicts accelerator pedal position (PP) at plot 902 which is indicative of operator torque demand. Map 900 further depicts boost pressure provided by the VGC at plot 904, a compressor pressure ratio is shown at plot 906 relative to choke limit 909 and surge limit 907, the actuation of the ACT to one of three positions (nominal, choke slot, surge slot) is shown at plot 908, the position of an HP EGR valve is shown at plot 910, and the position of an exhaust waste-gate valve coupled in a bypass across the exhaust turbine of the turbocharger is shown at plot 912.

Prior to time t1, the engine is operating with no boost due to a low operator torque demand. The compressor pressure ratio is outside of both the choke and the surge margin. The ACT is positioned at the default, nominal position. The HP-EGR valve is closed. An LP-EGR valve (not shown) may be at least partially open. The waste-gate valve is open since boost pressure is not required.

At t1, there is an increase in operator torque demand as indicated by a gradual and moderate increase in accelerator pedal position. Responsive to the increase in operator torque demand, boost pressure is increased by moving the waste-gate valve to a more closed position to increase turbine spin-up. In addition, the HP-EGR valve opening is increased. The compressor operating point remains outside of choke and surge limit and so the ACT is maintained in the nominal position. At this position of the ACT, both the surge slot and the choke slot are closed.

Between t1 and t2, there is another overall increase in operator torque demand. However this time the increase in driver demand is an overall more rapid increase in accelerator pedal position. In addition, the accelerator pedal is applied and released multiple times between t1 and t2. Responsive to the increase in operator torque demand, boost pressure is further increased by moving the waste-gate valve to a more closed position and further increasing HP-EGR valve opening. The compressor operating point remains outside of choke and surge limit and so the ACT is maintained in the nominal position.

Based on the pedal application frequency and degree between t1 and t2, the controller may compute a pedal energy density and infer that the operator is starting to drive more aggressively. Accordingly, after t2, the surge limit may be temporarily lowered (thereby decreasing the margin to surge) while the choke limit is maintained. Herein the controller anticipates surge is likely to occur based on the driver behavior and so by lowering the surge limit, surge control can be initiated earlier in the drive cycle. Shortly before t3, the compressor pressure ratio starts to move closer to the lowered surge limit.

At t3, there is a decrease in operator torque demand as indicated by a sudden release of the accelerator pedal. The sudden drop in torque demand causes the compressor pressure ratio to move into the margin for surge and reach the surge limit. If not addressed, the resulting surge (depicted at dashed segment 905) would cause NVH issues and drop in boosted engine performance. To address the surge, responsive to the decrease in operator torque demand, the ACT is actuated to a first position where it engages the surge slot. At this position of the ACT, the surge slot is open while the choke slot is closed. This position causes recirculation flow from the compressor impeller to the compressor inlet, improving the surge margin. In addition, pressure disturbances caused by the ACT actuation are compensated for by moving the waste-gate valve to a more open position and the HP-EGR valve to a more closed position. As such, the waste-gate and HP-EGR valve adjustment required to address the surge, the drop in torque demand, and compensate for the flow disturbance caused by the ACT actuation are smaller than those that would have been required if no ACT actuation were performed, as shown by dashed segments 911 and 913. In this way, by actuating the ACT to the surge slot, the compressor operating point remains outside of the surge limit while air path disturbances caused by the actuation are compensated for by EGR and waste-gate valve adjustments.

Between t4 and t5, the operator torque demand remains low and the compressor pressure ratio starts to move further away from the surge limit. Accordingly, shortly after t4, once the pressure ratio is sufficiently away from the surge limit, the ACT is actuated back to the nominal position where both the surge and choke slots are open. In addition, air path disturbances caused by the actuation are compensated for by EGR and waste-gate valve adjustments. In particular, the lower torque demand is met by increasing the opening of the waste-gate valve and decreasing the opening of the HP-EGR valve. In addition, due to continued non-aggressive drive behavior since t2, the surge limit is raised and returned to the earlier level.

Shortly before t5, there is an increase in operator torque demand as indicated by a sudden application of the accelerator pedal. The sudden rise in torque demand causes the compressor pressure ratio to move into the margin for choke and reach the choke limit 909. If not addressed, the resulting choke (depicted at dashed segment 916) would cause NVH issues and drop in boosted engine performance. To address the choke, responsive to the increase in operator torque demand, the ACT is actuated to a second position where it engages the choke slot. At this position of the ACT, the choke slot is open while the surge slot is closed. This position causes increased intake flow from the compressor inlet to the compressor impeller, improving the choke margin. In addition, pressure disturbances caused by the ACT actuation are compensated for by moving the waste-gate valve to a more closed position and the HP-EGR valve to a more open position. As such, the waste-gate and HP EGR valve adjustment required to address the surge, the drop in torque demand, and compensate for the flow disturbance caused by the ACT actuation are smaller than those that would have been required if no ACT actuation were performed, as shown by dashed segments 914 and 915. In this way, by actuating the ACT to the choke slot, the compressor operating point remains outside of the choke limit while air path disturbances caused by the actuation are compensated for by EGR and waste-gate valve adjustments.

Between t5 and t6, the operator torque demand remains high and the compressor pressure ratio starts to move further away from the choke limit. Accordingly, shortly after t6, once the pressure ratio is sufficiently away from the choke limit, the ACT is actuated back to the nominal position where both the surge and choke slots are open. In addition, air path disturbances caused by the actuation are compensated for by EGR and waste-gate valve adjustments. In particular, the higher torque demand is met by decreasing the opening of the waste-gate valve and increasing the opening of the HP-EGR valve.

In this way, a controller may actuate a sleeve of a variable geometry compressor casing to a position selected based on each of a compressor pressure ratio and a mass flow through the compressor; and adjusting each of an EGR actuator and a boost actuator based on the selected position to maintain the compressor pressure ratio during the actuating. The actuating may include, for example, predicting a change in each of a compressor surge margin relative to a surge limit and a compressor choke margin relative to a choke limit based on the compressor pressure ratio and mass flow; responsive to the predicted decrease in compressor surge margin, actuating the sleeve to a first position; and responsive to a predicted decrease in the compressor choke margin, actuating the sleeve to a second position. In one example, when the sleeve is in the first position, a surge slot of the compressor is open while a choke slot of the compressor is closed and compressed air is recirculated from compressor impeller blades to a compressor inlet via the surge slot, and wherein when the sleeve is in the second position, the surge slot is closed while the choke slot is open, and compressed air is recirculated from the compressor inlet to the compressor impeller blades via the choke slot. The sleeve may be actuated to the first position prior to the compressor pressure ratio reaching the surge limit, and the sleeve may be actuated to the second position prior to the compressor pressure ratio reaching the choke limit. The controller may predict the change in compressor surge margin or compressor choke margin based on driver behavior including estimated energy density of driver pedal demand. The predicting may be further based on input from a navigational system, the input including altitude and road gradient. In still further examples, the sleeve position may be further selected based on a prior frequency of sleeve actuation relative to a threshold, the threshold determined as a function of the estimated energy density of driver pedal demand, the threshold lowered as the estimated energy density increases. The sleeve may be maintained in a current (e.g., nominal) position responsive to the prior frequency of sleeve actuation being higher than the threshold even as the compressor surge margin or compressor choke margin decreases. The controller may further, responsive to no predicted decrease in the compressor surge margin or the compressor choke margin, maintain the sleeve in a default position, wherein both the surge slot and the choke slot are closed. In one example, the compressor is driven by an exhaust turbine, the EGR actuator includes an EGR valve coupled in an EGR passage recirculating exhaust from an exhaust passage, downstream of the turbine to upstream of the compressor, and the boost actuator includes one of a variable geometry turbine and a waste-gate valve, the waste-gate valve coupled in a waste-gate bypassing the exhaust turbine. The adjusting may include, responsive to the sleeve being actuated to the first position, increasing an opening of the EGR valve and increasing an opening of the waste-gate valve, the increasing based on a predicted drop in boost pressure due to the actuating of the sleeve to the first position; and responsive to the sleeve being actuated to the second position, decreasing the opening of the EGR valve and decreasing the opening of the waste-gate valve, the decreasing based on a predicted rise in boost pressure due to the actuating of the sleeve to the second position. In a further example, the adjusting includes, responsive to the sleeve being actuated to the first position, decreasing a blade angle of the variable geometry turbine, the decreasing based on a predicted change in boost pressure due to the actuating of the sleeve to the first position; and responsive to the sleeve being actuated to the second position, increasing a blade angle of the variable geometry turbine, the increasing based on the predicted change in boost pressure due to the actuating of the sleeve to the second position.

In this way, adjustments to the position of an active sleeve casing treatment can be coordinated with air flow path actuator adjustments to improve the operation of a variable geometry compressor. By filtering driver behavior and using the energy density of a driver's pedal actuation to adjust the surge and choke limits of a compressor in real-time, surge and choke can be better predicted and the surge and choke margins can be accordingly dynamically updated. By lowering the surge limit and increasing the permitted margin to surge during conditions when driver behavior is aggressive, surge mitigating ACT adjustments can be provided earlier and for a longer duration, improving the compressor efficiency. In addition, ACT actuation frequency can be limited, reducing flow pulsations and efficiency loss associated with the actuation frequency. By adjusting EGR flow and boost actuator operation based on the ACT actuation, any flow pulsations or disturbances arising from the ACT actuation can be compensated for, improving air flow to the compressor. Overall, compressor operating efficiency can be improved even during conditions when choke and surge could occur.

A method for an engine includes actuating a sleeve of a variable geometry compressor casing to a position selected based on each of a compressor pressure ratio and a mass flow through the compressor, and adjusting each of an EGR actuator and a boost actuator based on the selected position to maintain the compressor pressure ratio during the actuating. In a first example of the method, the actuating includes predicting a change in each of a compressor surge margin relative to a surge limit and a compressor choke margin relative to a choke limit based on the compressor pressure ratio and mass flow; responsive to the predicted decrease in compressor surge margin, actuating the sleeve to a first position; and responsive to a predicted decrease in the compressor choke margin, actuating the sleeve to a second position. A second example of the method optionally includes the first example and further includes wherein when the sleeve is in the first position, a surge slot of the compressor is open while a choke slot of the compressor is closed and compressed air is recirculated from compressor impeller blades to a compressor inlet via the surge slot, and wherein when the sleeve is in the second position, the surge slot is closed while the choke slot is open, and compressed air is recirculated from the compressor inlet to the compressor impeller blades via the choke slot. A third example of the method optionally includes one or more of the first and second examples, and further includes wherein the sleeve is actuated to the first position prior to the compressor pressure ratio reaching the surge limit, and wherein the sleeve is actuated to the second position prior to the compressor pressure ratio reaching the choke limit. A fourth example of the method optionally includes one or more of the first through third examples, and further includes, wherein the predicting the change in compressor surge margin or compressor choke margin is based on driver behavior including estimated energy density of driver pedal demand. A fifth example of the method optionally includes one or more of the first through fourth examples, and further includes, wherein the predicting is further based on input from a navigational system, the input including altitude and road gradient. A sixth example of the method optionally includes one or more of the first through fifth examples, and further includes, wherein the position is further selected based on a prior frequency of sleeve actuation relative to a threshold, the threshold determined as a function of the estimated energy density of driver pedal demand, the threshold lowered as the estimated energy density increases, wherein the sleeve is maintained in a current position responsive to the prior frequency of sleeve actuation being higher than the threshold even as the compressor surge margin or compressor choke margin decreases. A seventh example of the method optionally includes one of more of the first through sixth examples, and further includes, responsive to no predicted decrease in the compressor surge margin or the compressor choke margin, maintaining the sleeve in a default position, wherein both the surge slot and the choke slot are closed. An eighth example of the method optionally includes one or more of the first through seventh examples, and further includes, wherein the compressor is driven by an exhaust turbine, wherein the EGR actuator includes an EGR valve coupled in an EGR passage recirculating exhaust from an exhaust passage, downstream of the turbine to upstream of the compressor, and wherein the boost actuator includes one of a variable geometry turbine and a waste-gate valve, the waste-gate valve coupled in a waste-gate bypassing the exhaust turbine. A ninth example of the method optionally includes one or more of the first through eighth examples, and further includes, wherein the adjusting includes: responsive to the sleeve being actuated to the first position, increasing an opening of the EGR valve and increasing an opening of the waste-gate valve, the increasing based on a predicted drop in boost pressure due to the actuating of the sleeve to the first position; and responsive to the sleeve being actuated to the second position, decreasing the opening of the EGR valve and decreasing the opening of the waste-gate valve, the decreasing based on a predicted rise in boost pressure due to the actuating of the sleeve to the second position. A tenth example of the method optionally includes one or more of the first through ninth examples, and further includes, wherein the adjusting includes: responsive to the sleeve being actuated to the first position, decreasing a blade angle of the variable geometry turbine, the decreasing based on a predicted change in boost pressure due to the actuating of the sleeve to the first position; and responsive to the sleeve being actuated to the second position, increasing a blade angle of the variable geometry turbine, the increasing based on the predicted change in boost pressure due to the actuating of the sleeve to the second position.

Another method includes dynamically adjusting each of a choke margin to a choke limit and a surge margin to a surge limit of a compressor based on driver behavior including energy density of driver pedal demand; actuating a sleeve of an active casing of the compressor to a choke slot responsive to compressor operation in the choke margin; and actuating the sleeve to a surge slot responsive to compressor operation in the surge margin. In a first example of the method, the actuating is responsive to a change in driver pedal demand, the method further comprising, estimating the energy density of the driver pedal demand based on each of a rate, a magnitude, and a frequency of driver pedal application over a drive cycle. A second example of the method optionally includes the first example, and further includes, adjusting each of an EGR actuator and a boost actuator based on the actuating to operate the compressor out of the choke margin or surge margin. A third example of the method optionally includes one or more of the first and second examples, and further includes wherein the EGR actuator includes one or more of a high pressure EGR valve recirculating exhaust gas from upstream of an exhaust turbine to downstream of the compressor, and a low pressure EGR valve recirculating exhaust gas from downstream of the exhaust turbine to upstream of the compressor, and wherein the boost actuator includes one of a waste-gate valve for flowing exhaust gas to a tailpipe while bypassing the turbine, and a variable geometry turbine actuator for adjusting a blade angle of the turbine. A fourth example of the method optionally includes one or more of the first through third examples, and further includes wherein the adjusting includes: responsive to the sleeve being actuated to the choke slot, decreasing an opening of the low pressure EGR valve, increasing an opening of the high pressure EGR valve, decreasing an opening of the waste-gate valve, and decreasing the blade angle; and responsive to the sleeve being actuated to the surge slot, increasing the opening of the low pressure EGR valve, decreasing the opening of the high pressure EGR valve, increasing the opening of the waste-gate valve, and increasing the blade angle. A fifth example of the method optionally includes one or more of the first through fourth examples, and further includes wherein each of the choke margin and the surge margin is further adjusted, dynamically, based on a measured frequency of sleeve actuation of the drive cycle, the surge margin increased and the choke margin decreased as the measured frequency exceeds a threshold frequency.

A system for an engine may include an engine; an intake compressor having an impeller, a choke slot, a surge slot, an actuatable annular casing housing the impeller, the casing comprising a sleeve slot, and an actuator coupled to a sleeve of the casing; an exhaust turbine; an EGR valve coupled in an EGR passage for recirculating exhaust gas from downstream of the turbine to upstream of the compressor; a pedal for receiving operator torque demand; and a controller with computer readable instructions stored on non-transitory memory for: responsive to a current change in pedal position, comparing compressor efficiency with the actuator at a current position relative to each of a first and second position, estimating compressor efficiency with the actuator at a first and a second position, the compressor efficiency estimated based on compressor pressure ratio, mass flow, the current change in pedal position, and a history of past changes in pedal position over a given drive cycle; actuating, via the actuator, the sleeve to one of the first and second position having greater compressor efficiency; estimating a boost pressure disturbance associated with the actuating; and adjusting the opening of the EGR valve based on the estimated boost pressure disturbance. In a first example of the system, the controller includes further instructions for: adjusting an exhaust flow bypassing the waste-gated turbine based on the estimated boost pressure disturbance when the turbine is a waste-gated turbine; and adjusting a blade angle of the turbine based on the estimated boost pressure disturbance when the turbine is a variable geometry turbine. A second example of the system optionally includes the first example, and further includes wherein in the first position, the sleeve slot is aligned with the choke slot, and compressed air is drawn into the impeller from a compressor inlet via the choke slot, and wherein in the second position, the sleeve slot is aligned with the surge slot, and compressed air is recirculated from the impeller to the compressor inlet via the surge slot.

In another representation, the vehicle system is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
actuating a sleeve of a variable geometry compressor casing to a selected position via a controller based on each of a compressor pressure ratio and a mass flow through the compressor as determined via the controller; and
adjusting each of an EGR actuator and a boost actuator via the controller based on the selected position to maintain the compressor pressure ratio during the actuating.

2. The method of claim 1, wherein the actuating includes:
predicting a change in each of a compressor surge margin relative to a surge limit and a compressor choke margin relative to a choke limit via the controller based on the compressor pressure ratio and mass flow;
responsive to a predicted decrease in compressor surge margin as determined via the controller, actuating the sleeve to a first position via the controller; and
responsive to a predicted decrease in the compressor choke margin as determined via the controller, actuating the sleeve to a second position via the controller.

3. The method of claim 2, further comprising:
opening a surge slot of the compressor while a choke slot of the compressor is closed and compressed air is recirculated from compressor impeller blades to a compressor inlet via the surge slot when the sleeve is in the first position; and closing the surge slot while the choke slot is open and compressed air is recirculated from the compressor inlet to the compressor impeller blades via the choke slot when the sleeve is in the second position.

4. The method of claim 3, further comprising, responsive to no predicted decrease in the compressor surge margin or the compressor choke margin as determined via the controller, maintaining the sleeve in a default position via the controller, wherein both the surge slot and the choke slot are closed.

5. The method of claim 3, further comprising driving the compressor by an exhaust turbine, recirculating exhaust from an exhaust passage downstream of the turbine to upstream of the compressor via the EGR actuator which includes an EGR valve coupled in an EGR passage, and wherein the boost actuator includes one of a variable geometry turbine and a waste-gate valve, the waste-gate valve coupled in a waste-gate bypassing the exhaust turbine.

6. The method of claim 5, wherein the adjusting includes:
responsive to the sleeve being actuated to the first position, increasing an opening of the EGR valve and increasing an opening of the waste-gate valve via the controller, the increasing based on a predicted drop in boost pressure due to the actuating of the sleeve to the first position; and
responsive to the sleeve being actuated to the second position, decreasing the opening of the EGR valve and decreasing the opening of the waste-gate valve via the controller, the decreasing based on a predicted rise in boost pressure due to the actuating of the sleeve to the second position.

7. The method of claim 5, wherein the adjusting includes:
responsive to the sleeve being actuated to the first position, increasing a nozzle opening of the variable geometry turbine via the controller, the increasing based on a predicted change in boost pressure due to the actuating of the sleeve to the first position; and
responsive to the sleeve being actuated to the second position, decreasing the nozzle opening of the variable geometry turbine via the controller, the decreasing based on the predicted change in boost pressure due to the actuating of the sleeve to the second position.

8. The method of claim 2, further comprising:
actuating the sleeve to the first position prior to the compressor pressure ratio reaching the surge limit; and
actuating the sleeve to the second position prior to the compressor pressure ratio reaching the choke limit.

9. The method of claim 2, further comprising predicting the change in compressor surge margin or the compressor choke margin based on driver behavior including an estimated energy density of a driver pedal demand.

10. The method of claim 9, wherein the predicting is further based on an input from a navigational system, the input including altitude and road gradient.

11. The method of claim 9, further comprising selecting the position based on a prior frequency of sleeve actuation relative to a threshold, the threshold determined as a function of the estimated energy density of the driver pedal demand, the threshold lowered as the estimated energy density increases, wherein the sleeve is maintained in a current position responsive to the prior frequency of sleeve actuation being higher than the threshold even as the compressor surge margin or the compressor choke margin decreases.

12. A method for a boosted engine, comprising:
dynamically adjusting each of a choke margin to a choke limit and a surge margin to a surge limit of a compressor based on driver behavior including energy density of driver pedal demand via a controller;
actuating a sleeve of an active casing of the compressor to a choke slot responsive to compressor operation in the choke margin via the controller; and
actuating the sleeve to a surge slot responsive to compressor operation in the surge margin via the controller.

13. The method of claim 12, wherein the actuating is responsive to a change in driver pedal demand as determined via the controller, the method further comprising estimating the energy density of the driver pedal demand based on each of a rate, a magnitude, and a frequency of driver pedal application over a drive cycle via the controller.

14. The method of claim 12, further comprising, adjusting each of an EGR actuator and a boost actuator based on the actuating to operate the compressor out of the choke margin or the surge margin via the controller.

15. The method of claim 14, wherein the EGR actuator includes one or more of a high pressure EGR valve recirculating exhaust gas from upstream of an exhaust turbine to downstream of the compressor, and a low pressure EGR valve recirculating exhaust gas from downstream of the exhaust turbine to upstream of the compressor, and wherein the boost actuator includes one of a waste-gate valve for flowing exhaust gas to a tailpipe while bypassing the turbine, and a variable geometry turbine actuator for adjusting a nozzle opening of the turbine.

16. The method of claim 15, wherein the adjusting includes:
responsive to the sleeve being actuated to the choke slot, decreasing an opening of the low pressure EGR valve, increasing an opening of the high pressure EGR valve, decreasing an opening of the waste-gate valve, and decreasing the nozzle opening via the controller; and
responsive to the sleeve being actuated to the surge slot, increasing the opening of the low pressure EGR valve, decreasing the opening of the high pressure EGR valve, increasing the opening of the waste-gate valve, and increasing nozzle opening via the controller.

17. The method of claim 12, wherein each of the choke margin and the surge margin is further adjusted, dynamically, based on a measured frequency of sleeve actuation of the drive cycle via the controller, the surge margin increased and the choke margin increased as the measured frequency exceeds a threshold frequency.

18. A boosted engine system, comprising:
an engine;
an intake compressor having an impeller, a choke slot, a surge slot, an actuatable annular casing housing the impeller, the casing comprising a sleeve slot, and an actuator coupled to a sleeve of the casing;
an exhaust turbine;
an EGR valve coupled in an EGR passage for recirculating exhaust gas from downstream of the turbine to upstream of the compressor; a pedal for receiving operator torque demand; and
a controller with computer readable instructions stored on non-transitory memory for:
responsive to a current change in pedal position,
comparing a current compressor efficiency when the actuator is at a current position, which is relative to a compressor efficiency when the actuator is at each of a first and second position via the controller;
estimating the compressor efficiency when the actuator is at the first and the second position based on compressor pressure ratio, mass flow, the current change in pedal position, and a history of past changes in pedal position over a given drive cycle via the controller;
actuating, via the actuator, the sleeve to one of the first and second positions having greater compressor efficiency via the controller;
estimating a boost pressure disturbance associated with the actuating via the controller; and
adjusting an opening of the EGR valve via the controller based on the estimated boost pressure disturbance.

19. The system of claim 18, wherein the controller includes further instructions for:
adjusting an exhaust flow bypassing a waste-gated turbine based on the estimated boost pressure disturbance when the turbine is the waste-gated turbine; and
adjusting a blade angle of the turbine based on the estimated boost pressure disturbance when the turbine is a variable geometry turbine.

20. The system of claim 18, wherein in the first position, the sleeve slot is aligned with the choke slot, and compressed air is drawn into the impeller from a compressor inlet via the choke slot, and wherein in the second position, the sleeve slot is aligned with the surge slot, and compressed air is recirculated from the impeller to the compressor inlet via the surge slot.

* * * * *